(12) United States Patent
Hines et al.

(10) Patent No.: US 12,553,425 B2
(45) Date of Patent: Feb. 17, 2026

(54) COOLING FOR AN ELECTRICALLY OPERATED DISPLACEMENT PUMP

(71) Applicant: Graco Minnesota Inc., Minneapolis, MN (US)

(72) Inventors: Bradley H. Hines, Andover, MN (US); Paul W. Scheierl, Chisago City, MN (US); Brian W. Koehn, Minneapolis, MN (US); Jacob D. Higgins, White Bear Township, MN (US); Benjamin J. Paar, Minneapolis, MN (US); David L. Fehr, Dayton, MN (US)

(73) Assignee: Graco Minnesota Inc., Minneapolis, MN (US)

(*) Notice: Subject to any disclaimer, the term of this patent is extended or adjusted under 35 U.S.C. 154(b) by 49 days.

(21) Appl. No.: 18/283,981

(22) PCT Filed: Mar. 30, 2022

(86) PCT No.: PCT/US2022/022571
§ 371 (c)(1),
(2) Date: Sep. 25, 2023

(87) PCT Pub. No.: WO2022/212522
PCT Pub. Date: Oct. 6, 2022

(65) Prior Publication Data
US 2024/0183347 A1 Jun. 6, 2024

Related U.S. Application Data

(60) Provisional application No. 63/168,591, filed on Mar. 31, 2021, provisional application No. 63/311,682, filed on Feb. 18, 2022.

(51) Int. Cl.
*F04B 17/03* (2006.01)
*F04B 1/128* (2020.01)
(Continued)

(52) U.S. Cl.
CPC .............. *F04B 17/03* (2013.01); *F04B 53/08* (2013.01); *F04B 53/16* (2013.01); *F04B 1/128* (2013.01);
(Continued)

(58) Field of Classification Search
CPC .......... F04B 17/03; F04B 53/08; F04B 53/16; F04B 43/0027; F04B 43/04; F04B 39/066
See application file for complete search history.

(56) References Cited

U.S. PATENT DOCUMENTS 6,056,521 A    5/2000 Leu et al.
6,450,765 B1 * 9/2002 Carroll .................. F04D 29/162
                                                  415/173.1
(Continued)

FOREIGN PATENT DOCUMENTS

DE    102015105445 A1   10/2016
DE    102015218559 A1    3/2017
(Continued)

OTHER PUBLICATIONS

International Preliminary Report on Patentability for PCT Application No. PCT/US2022/022571, Dated Oct. 3, 2023, pp. 12.
(Continued)

*Primary Examiner* — David N Brandt
(74) *Attorney, Agent, or Firm* — Kinney & Lange, P.A.

(57) ABSTRACT

An electrically operated displacement pump includes an electric motor having a stator and a rotor. The rotor is connected to the fluid displacer to power pumping by the fluid displacer. A cooling circuit extends at least partially about an exterior of a motor housing that houses the electric motor. A fan assembly blows cooling air through the cooling circuit.

18 Claims, 18 Drawing Sheets

(51) Int. Cl.
- *F04B 1/14* (2020.01)
- *F04B 43/00* (2006.01)
- *F04B 43/04* (2006.01)
- *F04B 53/08* (2006.01)
- *F04B 53/16* (2006.01)

(52) U.S. Cl.
CPC ............ *F04B 1/14* (2013.01); *F04B 43/0027* (2013.01); *F04B 43/04* (2013.01)

(56) References Cited

U.S. PATENT DOCUMENTS

| | | | | |
|---|---|---|---|---|
| 2009/0194177 A1* | 8/2009 | Yokota | ............. | F04B 49/06 |
| | | | | 137/565.18 |
| 2010/0028173 A1* | 2/2010 | Ichise | ............. | F04B 39/066 |
| | | | | 417/371 |

FOREIGN PATENT DOCUMENTS

| | | | |
|---|---|---|---|
| EP | 2088320 | A2 | 8/2009 |
| EP | 3456966 | A1 | 3/2019 |

OTHER PUBLICATIONS

First Communication Pursuant to Article 94(3) EPC for EP Application No. 22719077.4, Dated Oct. 29, 2024, pp. 3.
International Search Report and Written Opinion for PCT Application No. PCT/US2022/022571, Dated Aug. 22, 2022, pp. 19.
Invitation to Pay Additional Fees for PCT Application No. PCT/US2022/022571, Dated Jul. 1, 2022, pp. 16.

* cited by examiner

COOLING FOR AN ELECTRICALLY OPERATED DISPLACEMENT PUMP

CROSS-REFERENCE TO RELATED APPLICATION(S)

This application is a national phase filing of PCT/US22/22571, filed Mar. 30, 2023 and entitled "COOLING FOR AN ELECTRICALLY OPERATED DISPLACEMENT PUMP," which claims priority to U.S. Provisional Application No. 63/168,591 filed Mar. 31, 2021 and entitled "COOLING FOR AN ELECTRICALLY OPERATED DISPLACEMENT PUMP," and claims priority to U.S. Provisional Application No. 63/311,682, filed Feb. 18, 2022 and entitled "COOLING FOR AN ELECTRICALLY OPERATED DISPLACEMENT PUMP," the disclosures of which are hereby incorporated by reference in their entireties.

BACKGROUND

This disclosure relates to positive displacement pumps and more particularly to a cooling system for positive displacement pumps.

Positive displacement pumps discharge a process fluid at a selected flow rate. In a typical positive displacement pump, a fluid displacer, usually a piston or diaphragm, pumps the process fluid. Some positive displacement pumps are double displacement pumps that employ two fluid displacers that pump the process fluid.

Fluid-operated double displacement pumps typically employ diaphragms as the fluid displacers and air or hydraulic fluid as a working fluid to drive the fluid displacers. The two diaphragms are joined by a shaft. In an air operated double displacement pump compressed air is the working fluid and is alternatingly provided to drive chambers of each diaphragm to drive displacement of the diaphragms. In a hydraulically-operated double displacement pump, hydraulic fluid, such as non-compressible hydraulic oil, is the working fluid that is alternatingly provided to first and second chambers to displace the fluid displacers.

Double displacement pumps can also be mechanically operated such that the pump does not require the use of working fluid. In such a case, a motor is operatively connected to the fluid displacers to drive reciprocation. In some examples, a gear train is disposed between the motor and the shaft connecting the fluid displacers to ensure that the pump can provide sufficient torque during pumping. The motor and gear train are disposed external to the main body of the pump. In some examples, the motor is disposed axially between the two diaphragms. Such pumps require cooling of the motor and motor controller.

SUMMARY

According to one aspect of the disclosure, a displacement pump for pumping a fluid includes an electric motor including a stator and a rotor; a fluid displacer configured to pump fluid by linear reciprocation of the fluid displacer; a cooling circuit including a flowpath about an exterior of a motor housing that houses the electric motor; and a fan assembly configured to blow air through the cooling circuit.

According to an additional or alternative aspect of the disclosure, a displacement pump for pumping a fluid includes an electric motor at least partially disposed in a motor housing and including a stator and a rotor; a first fluid displacer connected to the rotor such that a rotational output from the rotor provides a driving input to the first fluid displacer; and a cooling circuit extending about an exterior of the motor housing that houses the electric motor.

According to another additional or alternative aspect of the disclosure, a displacement pump for pumping a fluid includes an electric motor at least partially disposed in a motor housing and including a stator and a rotor; a controller operatively connected to the electric motor, the controller disposed in a control housing extending from the motor housing; a first fluid displacer connected to the rotor such that a rotational output from the rotor provides a driving input to the first fluid displacer to cause pumping by the first fluid displacer; and a cooling circuit having a flowpath extending between the motor housing and the control housing.

According to yet another additional or alternative aspect of the disclosure, a displacement pump for pumping a fluid includes an electric motor including a stator and a rotor; a fluid displacer configured to pump fluid and connected to the rotor to be driven by the rotor; a cooling circuit including a flowpath about an exterior of a motor housing that houses the electric motor; and a fan assembly configured to blow air into a portion of the flowpath disposed between a first thermally conductive wall of the motor housing and a second thermally conductive wall of a control housing in which electrical control components of the displacement pump are disposed, such that an output from the fan assembly contacts both the first thermally conductive wall and the second thermally conductive wall.

According to yet another additional or alternative aspect of the disclosure, a displacement pump for pumping a fluid includes an electric motor including a stator and a rotor; a fluid displacer configured to pump fluid and connected to the rotor to be driven by the rotor; a cooling circuit including a flowpath about a curved exterior of a motor housing that houses the electric motor; and a fan assembly configured to blow air through the cooling circuit.

According to yet another additional or alternative aspect of the disclosure, a displacement pump for pumping a fluid includes an electric motor including a stator and a rotor; a fluid displacer configured to pump fluid and connected to the rotor to be driven by the rotor; a cooling circuit including a flowpath about an exterior of a motor housing that houses the electric motor; and a fan assembly configured to blow air through the cooling circuit, an inlet of the fan assembly is oriented to receive the air axially along a fan axis that an impeller of the fan assembly rotates on, and an outlet of the fan assembly is oriented to output the air transverse to the fan axis.

According to yet another additional or alternative aspect of the disclosure, a displacement pump for pumping a fluid includes an electric motor including a stator and a rotor; a motor housing that houses the electric motor, the motor housing including a housing body and a plurality of heat sinks projecting from the housing body; a fluid displacer configured to pump fluid and connected to the rotor to be driven by the rotor; a cooling circuit including a flowpath about an exterior of the motor housing; and a fan assembly configured to blow air through the cooling circuit.

According to yet another additional or alternative aspect of the disclosure, a displacement pump for pumping a fluid includes an electric motor including a stator and a rotor; a fluid displacer configured to pump fluid and connected to the rotor to be driven by the rotor; a cooling circuit including a flowpath about an exterior of a motor housing that houses the electric motor; and a fan assembly configured to blow air through the cooling circuit. The flowpath extends at least 90-degrees about the motor housing.

DETAILED DESCRIPTION

This disclosure relates to cooling of electrically operated pumps. The electrically operated pumps include an electric motor that provides driving force to a fluid displacement member of the pump. The electric motor and electrical control components, such as those mounted on circuit boards, etc., generate heat during operation. Those components requiring cooling to dissipate the heat. According to the present disclosure, the electric motor and, in some examples, the control components are actively cooled by a cooling assembly that blows cooling air over the housings of such components to wick heat from those heat generating components. The housings of the motor and control components can be formed from thermally conductive material that is exposed directly to the cooling flow generated by the cooling assembly. Such a configuration facilitates cooling of both the electric motor and the control components by a single cooling flow.

Figure 1A:
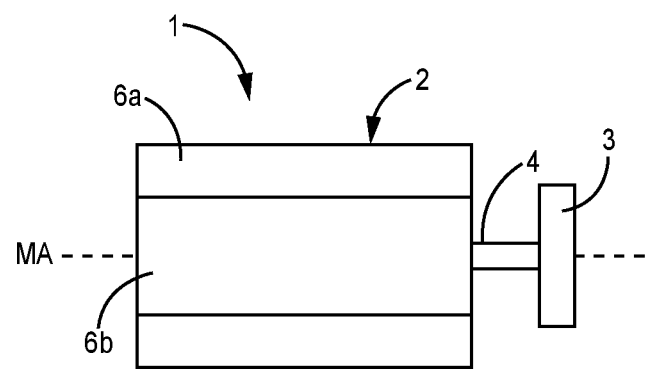
FIG. 1A is a first block schematic diagram of an electrically operated pump.
Figure 1B:
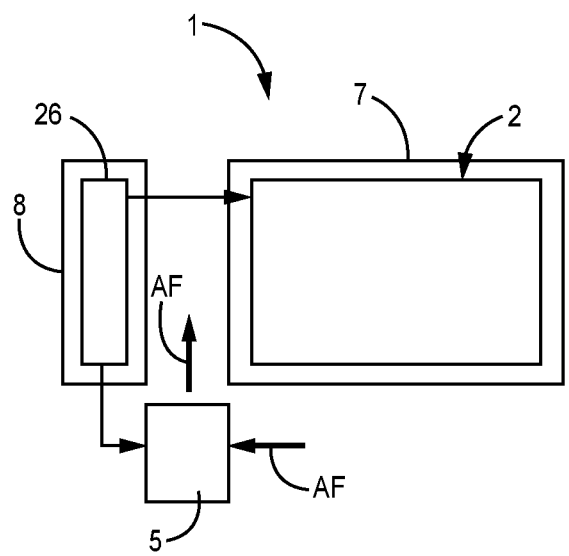
FIG. 1B is a second block schematic diagram of an electrically operated pump.

FIG. 1A is a first block schematic diagram of electrically operated pump 1. FIG. 1B is a second block schematic diagram of electrically operated pump 1. FIGS. 1A and 1B will be discussed together. Motor 2, fluid displacer 3, driver 4, cooling assembly 5, and controller 26. Motor 2 includes motor components 6a, 6b. Motor 2 is at least partially disposed in motor housing 7. Controller 26 is at least partially disposed in control housing 8.

Motor 2 is disposed within a motor housing 7 and is configured to drive displacement of fluid displacer 3. Motor 2 includes motor components 6a, 6b, one of which is formed as a stator is configured to electromagnetically drive rotation of the other one of motor components 6a, 6b that is formed as a rotor. The rotor rotates on the motor axis MA. For example, motor component 6a can be a stator and motor component 6b can be a rotor in an inner rotator example, with the rotor radially within the stator. In other examples, motor component 6b can be a stator and motor component 6a can be a rotor in an outer rotator example, with the stator radially within the rotor.

The rotor is configured to rotate on a rotational axis in response to current (such as a direct current (DC) signals and/or alternating current (AC) signals) through the stator. The motor 2 can be a reversible motor in that the stator can cause the rotor to rotate in either of two rotational directions (e.g., alternating between clockwise and counterclockwise). The rotor is connected to the fluid displacer 3 via driver 4. Driver 4 can receive a rotational output from the rotor to drive displacement of fluid displacer 3.

It is understood that fluid displacer 3 can be configured to reciprocate along an axis, rotate on an axis, or be otherwise displaced to pump the fluid. In some examples, driver 4 can be configured to receive a rotary output from the rotor and provide a linear, reciprocating input to fluid displacer 3. In other examples, the fluid displacer 3 can be a rotor configured to rotate within or about a stationary member. Fluid displacers 3 can be of any type suitable for pumping fluid. For example, fluid displacers 20 can be configured as diaphragms or pistons in reciprocating examples, or configured as rotating elements in rotational pump configurations. Pump 1 can be configured as a progressive cavity pump, impeller pump, peristaltic pump, among other options. In examples where the pump 1 includes a rotating fluid displacer 3, it is understood that the fluid displacer 3 can be directly connected to the rotor. For example, driver 4 can be formed as a component of the rotor, such as integrally with the rotor. In the example shown, pump 1 includes a single fluid displacer 3, but it is understood that pump 1 can include one, two, or more fluid displacers 3 operatively connected to the motor 2 to be driven by the motor 2. It is understood that fluid displacer 3 can be configured to reciprocate or rotate on an axis coaxial with the motor axis MA or misaligned with the motor axis MA. For example, the motor 2 can be connected to the fluid displacer 3 by an eccentric driver such that the motor axis MA and the axis of reciprocation of the fluid displacer 3 are not coaxial.

Controller 26 is operatively connected to motor 2 to control operation of motor 2. Controller 26 can further be operatively connected to cooling assembly 5 to control operation of the active components of cooling assembly 5 (e.g., the impeller of the cooling assembly 5). The controller 26 is configured to store software, implement functionality, and/or process instructions. The controller 26 can include memory and control circuitry configured to implement functionality and/or process instructions. For example, the control circuitry can be capable of processing instructions stored in the memory. Examples of the control circuitry can include one or more of a processor, a microprocessor, a controller, a digital signal processor (DSP), an application specific integrated circuit (ASIC), a field-programmable gate array (FPGA), or other equivalent discrete or integrated logic circuitry. The controller 26 can be of any suitable configuration for gathering data, processing data, etc. The controller 26 can receive inputs, provide outputs, generate commands for controlling operation of motor 2, etc. The controller 26 can be configured to receive inputs and/or provide outputs via a user interface. The controller 26 can include hardware, firmware, and/or stored software. The controller 26 can be entirely or partially mounted on one or more circuit boards.

Cooling assembly 5 is configured to actively cool the heat generating components of pump 1, such as motor 2 and controller 26. Cooling assembly 5 can include a fan that draws a cooling airflow AF in and blows a cooling airflow AF out. The intake cooling airflow can flow over motor housing 7 of motor 2 and, in some examples, over control housing 8 of controller 26. The output cooling airflow from cooling assembly 5 can flow over both the motor housing 7 and the control housing 8. As shown in FIG. 1B, the cooling assembly 5 can be configured to output the cooling airflow into a passage disposed directly between and defined at least partially by the motor housing 7 and the control housing 8. The motor housing 7 and control housing 8 can thus define the passage that the cooling airflow flows through, such that the cooling airflow can wick heat from both the control components and motor components. At least the portions of the motor housing 7 and the control housing 8 exposed to the cooling airflow AF can be formed by thermally conductive material to facilitate efficient heat transfer. In some examples, heat sinks extend from one or both of motor housing 7 and control housing 8 and be exposed to the cooling airflow AF to increase the surface area of the respective housing and facilitate more efficient heat transfer.

Pump 1 provides significant advantages. Cooling assembly 5 actively blows cooling air over the main heat sources of the pump 1, providing efficient heat transfer relative to a passive cooling arrangement. The housings 7, 8 of those heat generating components can be formed from thermally conductive material to facilitate efficient heat transfer. Cooling assembly 5 actively blowing the cooling flow over the housings of the heat generating components, actively exchanging the heated air for cool air providing for more efficient cooling. The cooling configuration of pump 1 facilitates longer operation and continuous operation of pump 1 at higher speeds and greater flowrates without overheating. The cooling configuration allows for more efficient pumping and fluid transfer.

Figure 2A:
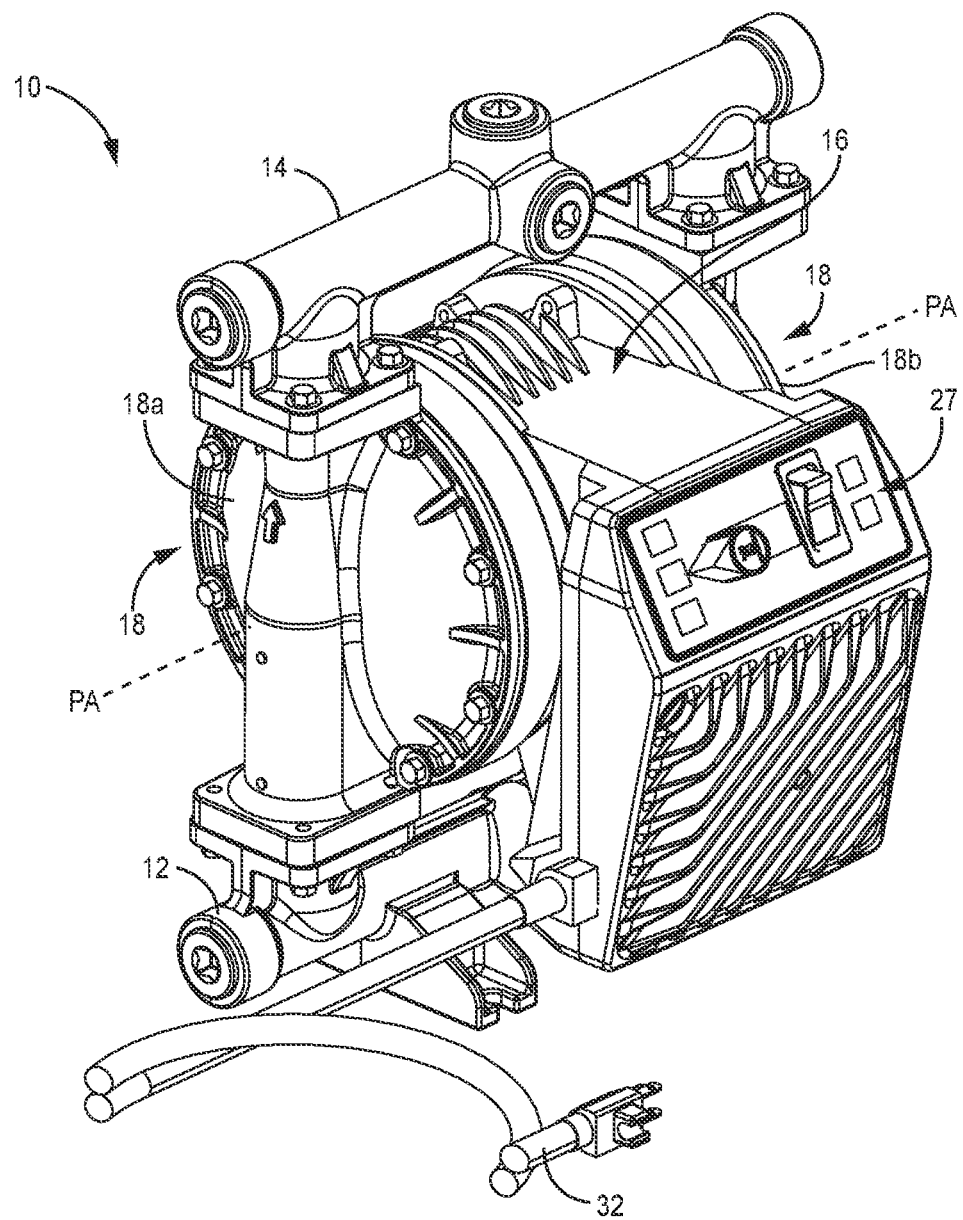
FIG. 2A is a front isometric view of an electrically operated pump.
Figure 2B:
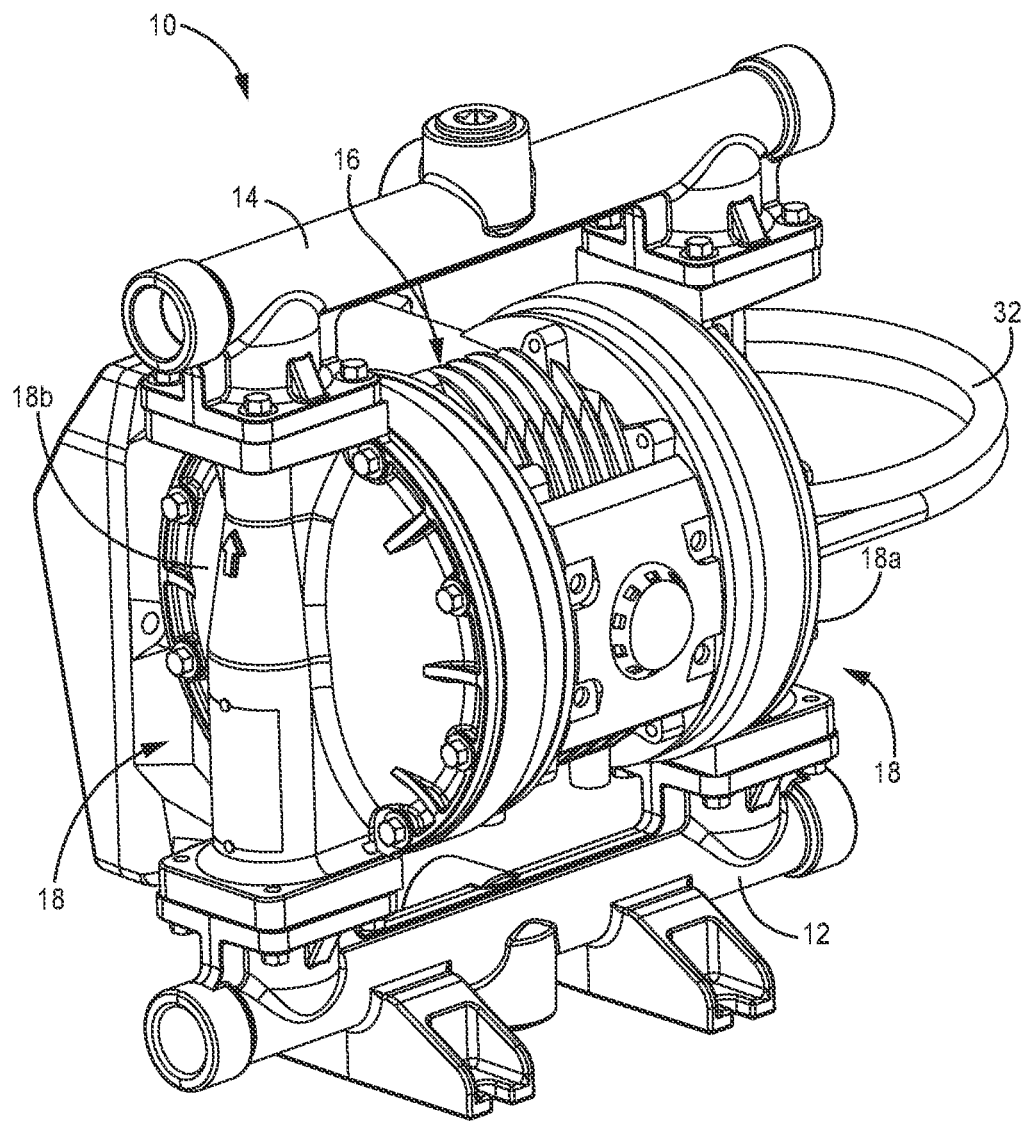
FIG. 2B is a rear isometric view of the electrically operated pump.
Figure 2C:
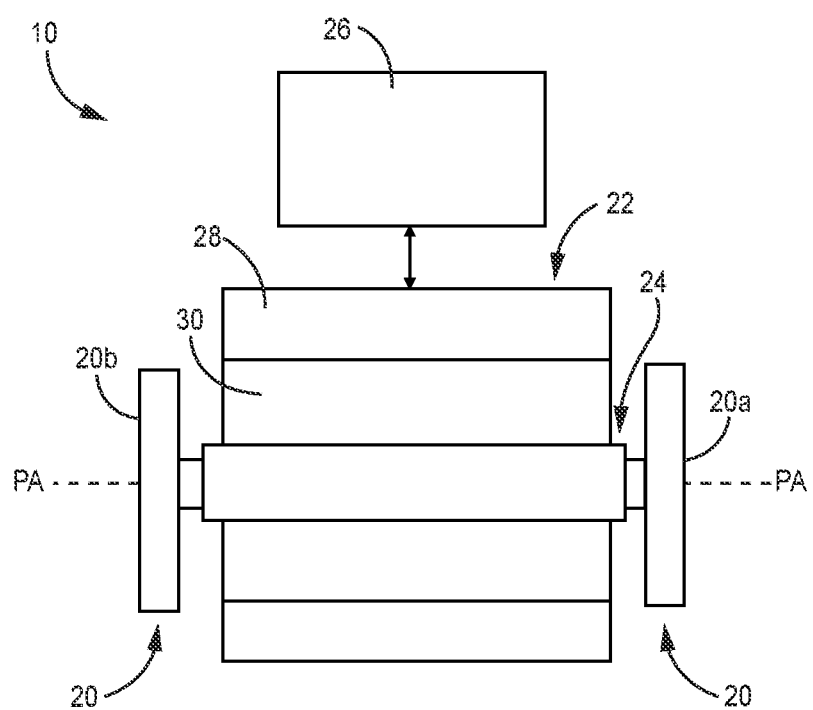
FIG. 2C is a block schematic diagram of an electrically operated pump.

FIG. 2A is a front isometric view of electrically operated pump 10. FIG. 2B is a rear isometric view of pump 10. FIG. 2C is a block schematic diagram of pump 10. FIGS. 2A-2C will be discussed together. Pump 10 is substantially similar to pump 1 shown in FIGS. 1A and 1B. Pump 10 includes inlet manifold 12, outlet manifold 14, pump body 16, fluid covers 18a, 18b (collectively herein "fluid cover 18" or "fluid covers 18"), fluid displacers 20a, 20b (collectively herein "fluid displacer 20" or "fluid displacers 20"), motor 22, driver 24, and controller 26. Motor 22 includes stator 28 and rotor 30. Pump body 16 is disposed between fluid covers 18a, 18b. Motor 22 is disposed within pump body 16 and is configured to drive displacement of fluid displacers 20. While motor 22 shown as disposed on the pump axis PA such that a rotational axis of rotor 28 is coaxial with the pump axis PA, it is understood that not all examples are so limited. For example, the motor 22 can be connected to the fluid displacer 20 by an eccentric driver and such that the rotational axis and pump axis PA are not coaxial in such a case. The rotational axis can be transverse to the pump axis PA. In some examples, the rotational axis can be orthogonal to the pump axis PA.

In the example shown, motor 22 is disposed coaxial with fluid displacers 20, through it is understood that not all examples are so limited. Motor 22 is an electric motor having stator 28 and rotor 30. Stator 28 includes armature windings and rotor 30 includes permanent magnets. Rotor 30 is configured to rotate on a rotational axis in response to current (such as a direct current (DC) signals and/or alternating current (AC) signals) through stator 28. Motor 22 is a reversible motor in that stator 28 can cause rotor 30 to rotate in either of two rotational directions (e.g., alternating between clockwise and counterclockwise). Rotor 30 is connected to the fluid displacers 20 via driver 24. In the example shown, driver 24 is configured to receive a rotary output from rotor 30 and provide a linear, reciprocating input to fluid displacers 20. It is understood that, while fluid displacers 20 are described as linearly reciprocating, some examples of pump 10 includes a fluid displacer 20 that is configured to rotate to pump the fluid. For example, the fluid displacer can be a rotor configured to rotate within or about a stationary member. For example, pump 10 can be configured as a progressive cavity pump, impeller pump, peristaltic pump, among other options. In examples where the pump 10 includes a rotating fluid displacer 20, it is understood that the fluid displacer 20 can be directly connected to the rotor 28 without an intermediate driver 24.

Fluid displacers 20 can be of any type suitable for pumping fluid from inlet manifold 12 to outlet manifold 14. For example, fluid displacers 20 can be configured as diaphragms or pistons in reciprocating examples, or configured as rotating elements in rotational pump configurations. While pump 10 is shown as including two fluid displacers 20, it is understood that some examples of pump 10 include a single fluid displacer 20. It is understood that the teachings discussed herein can apply equally to displacement pumps having any desired number of fluid displacers 20 and the fluid displacers 20 can be formed in any desired manner, such as diaphragms or pistons. Pump 10 can be referred to as a diaphragm pump when fluid displacers 20 are formed by one or more diaphragms. Pump 10 can be referred to as a piston pump when fluid displacers 20 are formed by one or more pistons.

Controller 26 is operatively connected to motor 22 to control operation of motor 22. The controller 26 is configured to store software, implement functionality, and/or process instructions. The controller 26 can include memory and control circuitry configured to implement functionality and/or process instructions. For example, the control circuitry can be capable of processing instructions stored in the memory. Examples of the control circuitry can include one or more of a processor, a microprocessor, a controller, a digital signal processor (DSP), an application specific integrated circuit (ASIC), a field-programmable gate array (FPGA), or other equivalent discrete or integrated logic circuitry. The controller 26 can be of any suitable configuration for gathering data, processing data, etc. The controller 26 can receive inputs, provide outputs, generate commands for controlling operation of motor 22, etc. The controller 26 can be configured to receive inputs and/or provide outputs via user interface 27. The controller 26 can include hardware, firmware, and/or stored software. The controller 26 can be entirely or partially mounted on one or more circuit boards.

User interface 27 of controller 26 is shown. The user can provide inputs to controller 26 via user interface 27 to control operation of pump 10. During operation, control signals are provided to stator 28 to cause stator 28 to drive rotation of rotor 30. Driver 24 receives the rotational output from rotor 30 as an input and converts that rotational input into a linear output to drive reciprocation of fluid displacers 20. In some examples, rotor 30 rotates in the first rotational direction to drive fluid displacers 20 in a first axial direction and rotates in the second rotational direction opposite the first rotational direction to drive fluid displacers 20 in a second axial direction opposite the first axial direction.

In the example shown, driver 24 causes fluid displacers 20 to reciprocate along pump axis PA through alternating suction and pumping strokes. During the suction stroke, the fluid displacer 20 draws process fluid from inlet manifold 12 into a process fluid chamber defined, at least in part, by fluid covers 18 and fluid displacers 20. During the pumping stroke, the fluid displacer 20 drives process fluid from the process fluid chamber to outlet manifold 14. Typically, depending on the arrangement of check valves, the two fluid displacers 20 are operated 180-degrees out of phase, such that a first fluid displacer 20 is driven through a pumping stroke (e.g., driving process fluid downstream from the pump) while a second fluid displacer 20 is driven through a suction stroke (e.g., drawing process fluid from upstream and into the pump). In the example shown, pump 10 includes two fluid displacers 20 that can simultaneously changeover (e.g., transition between the pumping stroke and the suction stroke), but 180-degrees out of phase with respect to each other.

Driver 24 is directly connected to rotor 30 and fluid displacers 20 are directly driven by driver 24. As such, motor 22 directly drives fluid displacers 20 without the presence of intermediate gearing, such as speed reduction gearing. Power cord 32 extends from pump 10 and is configured to provide electric power to the electronic components of pump 10. Power cord 32 can connect to a wall socket.

It is understood that, in some examples, the pump 10 is configured with a single fluid displacer 20. Such a pump 10 can be either a single displacement pump, which outputs the process fluid during the pumping stroke but not the suction stroke, or a double displacement pump, which outputs the process fluid during both the pumping stroke and the suction stroke. For example, the single fluid displacement member 20 can be a piston for a double displacement pump that reciprocates within a cylinder. The piston includes an internal flowpath through the piston between an upstream pump chamber and a downstream pump chamber that are separated by the piston interfacing with the cylinder. The outlet check valve is disposed within the piston itself to reciprocate with the piston. During a first stroke, the piston reduces the size of the upstream chamber, opens the outlet valve in the piston, closes an inlet valve on an opposite side of the upstream chamber from the piston, and causes the process fluid to flow through the piston and downstream from the cylinder. During a second stroke, the piston reduces the size of the downstream chamber and increases the size of the upstream chamber, closes the outlet valve, opens the inlet valve, outputs process fluid from the downstream chamber, and draws process fluid into the upstream chamber through the inlet valve.

Figure 3:
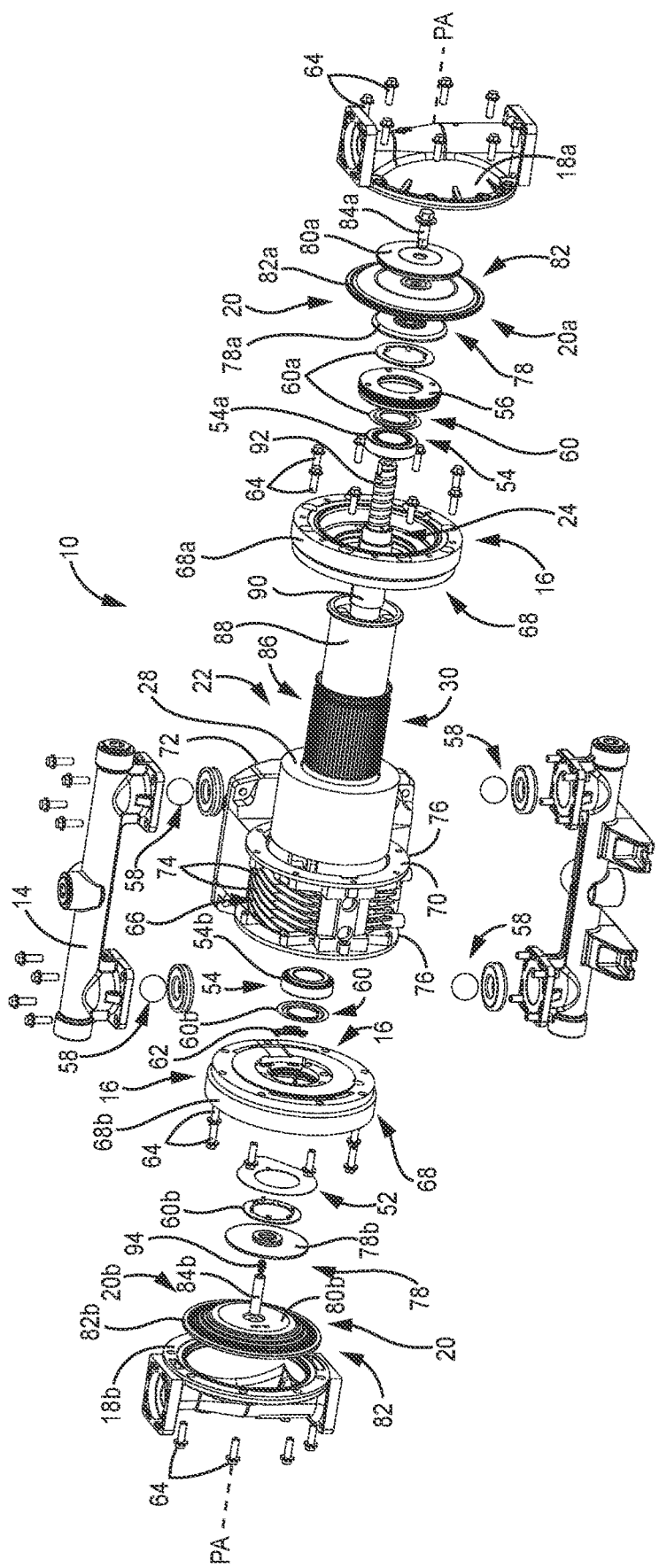
FIG. 3 is an exploded isometric view of an electrically operated pump.

FIG. 3 is an exploded front isometric view of pump 10. Pump 10 includes inlet manifold 12, outlet manifold 14, pump body 16, fluid covers 18a, 18b (collectively herein "fluid cover 18" or "fluid covers 18"), fluid displacers 20a, 20b (collectively herein "fluid displacer 20" or "fluid displacers 20"), motor 22, driver 24, bearings 54a, 54b (collectively herein "bearing 54" or "bearings 54"), motor nut 56, pump check valves 58, grease caps 60a, 60b (collectively herein "grease cap 60" or "grease caps 60"), position sensor 62, and housing fasteners 64.

Pump body 16 includes central portion 66 and end caps 68a, 68b (collectively herein "end cap 68" or "end caps 68"). Central portion 66 includes motor housing 70, control housing 72, and heat sinks 74. Fluid displacers 20a, 20b are configured as diaphragms in the example shown and respectively include inner plates 78a, 78b (collectively herein "inner plate 78" or "inner plates 78"); outer plates 80a, 80b (collectively herein "outer plate 80" or "outer plates 80"); membranes 82a, 82b (collectively herein "membrane 82" or "membranes 82"), and fasteners 84a, 84b. Motor 22 includes stator 28 and rotor 30. Rotor 30 includes permanent magnet array 86 and rotor body 88. Drive nut 90 and screw 92 of driver 24 are shown.

End caps 68a, 68b are disposed on opposite lateral sides of central portion 66 and are attached to central portion 66 to form pump body 16. Housing fasteners 64 extend through end caps 68 into pump body 16 to secure end caps 68 to pump body 16. Specifically, housing fasteners 64 extend through end caps 68 and into fastener openings formed in body flanges 76 formed on motor housing 70 of pump body 16. Heat sinks 74 are formed on central portion 66. In the example shown, heat sinks 74 are formed by fins, but it is understood that heat sinks can be of any configuration suitable for increasing the surface area of pump body 16 to facilitate heat exchange to cool the heat generating components of pump 10, such as motor 22 and controller 26.

Fluid covers 18a, 18b are connected to end caps 68a, 68b, respectively. Housing fasteners 64 secure fluid covers 18 to end caps 68. Inlet manifold 12 is connected to each fluid cover 18. Inlet ones of pump checks 58 are disposed between inlet manifold 12 and fluid covers 18a, 18b. The inlet ones of pump checks 58 are one-way valves configured to allow the process fluid to flow into process fluid chambers formed by a fluid displacement member 20 and fluid cover 18 and prevent retrograde flow from the process fluid chambers to inlet manifold 12. Outlet manifold 14 is connected to each fluid cover 18. Outlet ones of pump checks 58 are disposed between outlet manifold 14 and fluid covers 18a, 18b. The outlet ones of pump checks 58 are one-way valves configured to allow the process fluid to flow out of the process fluid chambers to outlet manifold 14 and to prevent retrograde flow from outlet manifold 14 to the process fluid chambers.

Motor 22 is disposed within motor housing 70 between end caps 68. Control housing 72 is connected to and extends from motor housing 70. Motor housing 70 can be substantially similar to motor housing 7 (FIG. 1B). Control housing 72 can be substantially similar to control housing 72 (FIG. 1B). Control housing 72 is configured to house control elements of pump 10, such as controller 26 (FIGS. 1B and 2C). Stator 28 surrounds rotor 30 and drives rotation of rotor 30. As such, motor 22 can be considered to be an inner rotator motor. Rotor 30 rotates on a rotational axis, coaxial with pump axis PA in the example shown, and is disposed coaxially with driver 24 and fluid displacers 20. Permanent magnet array 86 is disposed on rotor body 88.

Drive nut 90 is disposed within and connected to rotor body 88. Drive nut 90 can be attached to rotor body 88 via fasteners (e.g., bolts), adhesive, or press-fitting, among other options. Drive nut 90 rotates with rotor body 88. Drive nut 90 is mounted to bearings 54a, 54b at opposite axial ends of drive nut 90. Bearings 54 are configured to support both axial and radial forces. In some examples, bearings 54 comprise tapered roller bearings. Screw 92 extends through drive nut 90 and is connected to each fluid displacer 20. Screw 92 reciprocates along pump axis PA to drive fluid displacers 20 through respective pumping and suction strokes. Rolling elements (not shown), such as balls or elongate rollers among other options, can be disposed between drive nut 90 and screw 92 to support screw 92 relative to drive nut 90. As such, screw 92 may not directly contact drive nut 90. Instead, the rolling elements engage the thread of screw 92, receive the rotational input from drive nut 90, and drive axial displacement of screw 92.

Motor nut 56 connects to a portion of pump body 16 housing stator 28. Motor nut 56 can be considered to connect to a stator housing of pump 10, which stator housing can be formed by the motor housing 70 and end caps 68a, 68b. In the example shown, motor nut 56 connects to end cap 68a and secures bearings 54 within pump body 16. Motor nut 56 preloads bearings 54. Screw 92 can reciprocate through motor nut 56 during operation. Grease cap 60a is supported by motor nut 56 and motor nut 56 aligns grease cap 60a relative to bearing 54a. Grease cap 60b is disposed adjacent bearing 54b. Grease caps 60 prevent contaminants from entering bearings 54 and retain any grease that may liquify during operation.

Fluid displacer 20a is connected to first end of screw 92. Membrane 82a is captured between inner plate 78a and outer plate 80a. Fastener 84a extends through each of inner plate 78a, outer plate 80a, and membrane 82a and into screw 92 to connect fluid displacer 20a to driver 24. An outer circumferential edge of membrane 82a is captured between fluid cover 18a and end cap 68a. Fluid displacer 20b is connected to an opposite axial end of screw 92 from fluid displacer 20a. In the example shown, membrane 82b is overmolded onto outer plate 80b. Fastener 84b extends from outer plate 80b through the inner plate 78b and into screw 92 to connect fluid displacer 20b to driver 24. An outer circumferential edge of membrane 82b is captured between fluid cover 18b and end cap 68b. While fluid displacers 20a, 20b are described as having different configurations, it is understood that pump 10 can include fluid displacers 20a, 20b having the same or differing configurations. It is further understood that fluid displacers 20 can be configured as pistons connected to the opposite axial ends of screw 92, among other options.

During operation, current signals are provided to stator 28 to electromagnetically drive rotation of rotor 30. Position sensor 62 is disposed proximate rotor 30, as discussed in more detail below, and generates position data regarding the rotational position of rotor 30 relative to stator 28. For example, position sensor 62 can include an array of Hall-effect sensors responsive to the polarity of the permanent magnets in permanent magnet array 86. Controller 26 can utilize the position data to commutate motor 22.

Driver 24 converts rotational motion from rotor 30 into linear motion of fluid displacers 20. Rotor body 88 rotates about pump axis PA, in the example shown, and drives rotation of drive nut 90. Drive nut 90 drives screw 92 axially along pump axis PA, such as by engagement of rolling elements disposed between drive nut 90 and screw 92 and that support drive nut 90 relative to screw 92. The rolling elements support drive nut 90 relative screw 92 such that drive nut 90 does not contact screw 92 during operation. The rolling elements translate the rotation of drive nut 90 into linear movement of screw 92. Screw 92 drives fluid displacers 20 through respective pumping and suction strokes. In some examples, rotor 30 is rotated in a first rotational direction to cause screw 92 to displace in a first axial direction and rotor 30 is rotated in a second rotational direction opposite the first rotational direction to cause screw 92 to displace in a second axial direction opposite the first axial direction.

Motor 22 is axially aligned with fluid displacers 20 and drives reciprocation of fluid displacers 20. Rotor 30 rotates on a rotational axis and fluid displacers 20 reciprocate on pump axis PA, in the example shown. In the example shown the rotational axis is coaxial with pump axis PA, but it is understood that not all examples are so limited. Pump 10 provides significant advantages. Motor 22 being axially aligned with fluid displacers 20 facilitates a compact pump arrangement providing a smaller package relative to other mechanically-driven and electrically-driven pumps. In addition, motor 22 does not include gearing, such as reduction gears, between motor 22 and fluid displacers 20. Eliminating that gearing provides a more reliable, simpler pump by reducing the count of moving parts. Eliminating the gearing also provides a quieter pump operation.

Figure 4A:
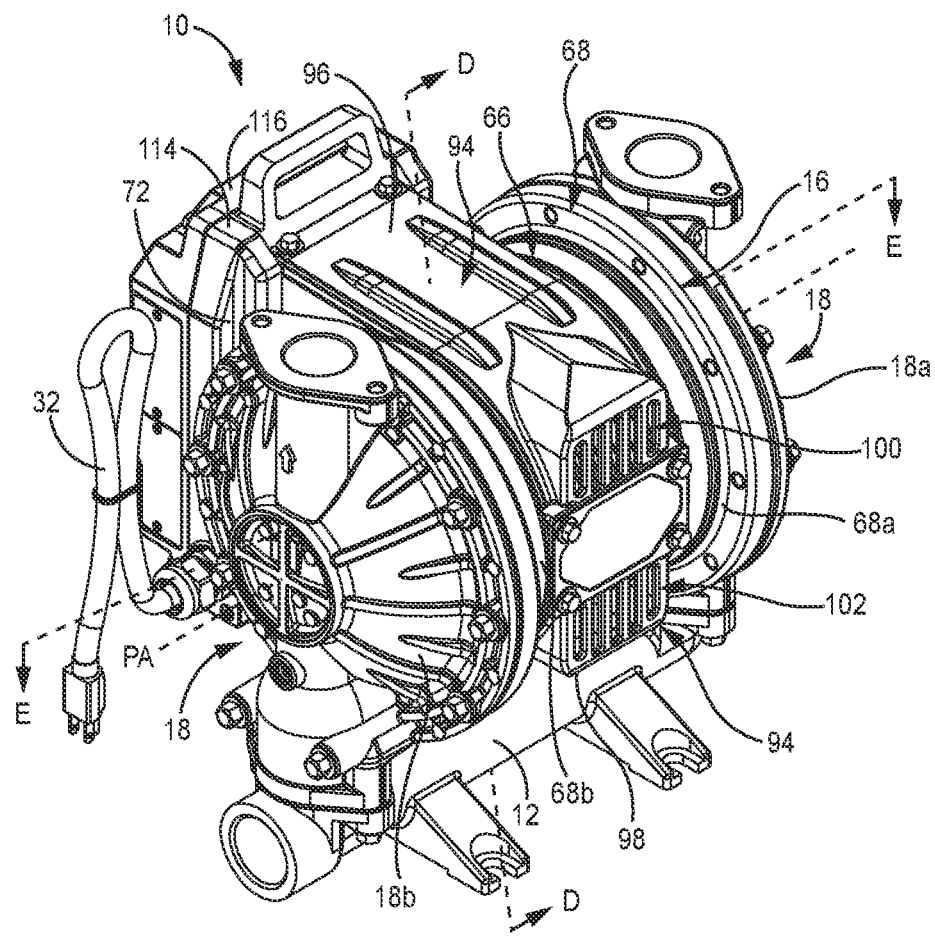
FIG. 4A is an isometric view of an electrically operated pump.
Figure 4B:
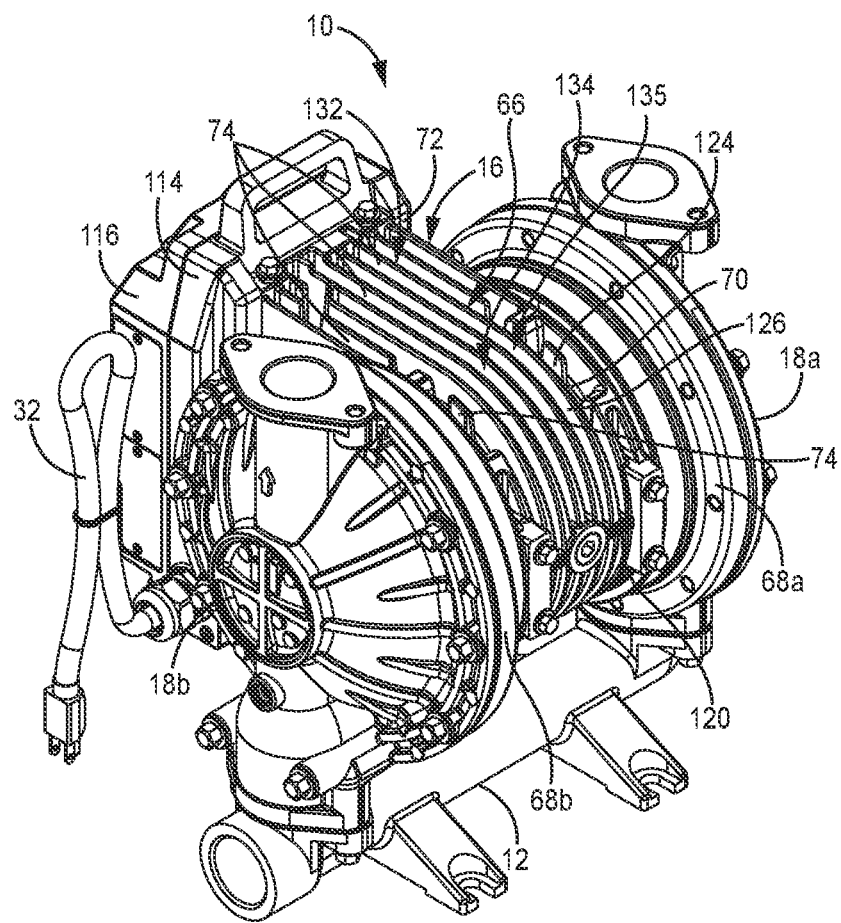
FIG. 4B is an isometric view of the electrically operated pump shown in FIG. 4A but with a housing cover removed.
Figure 4C:
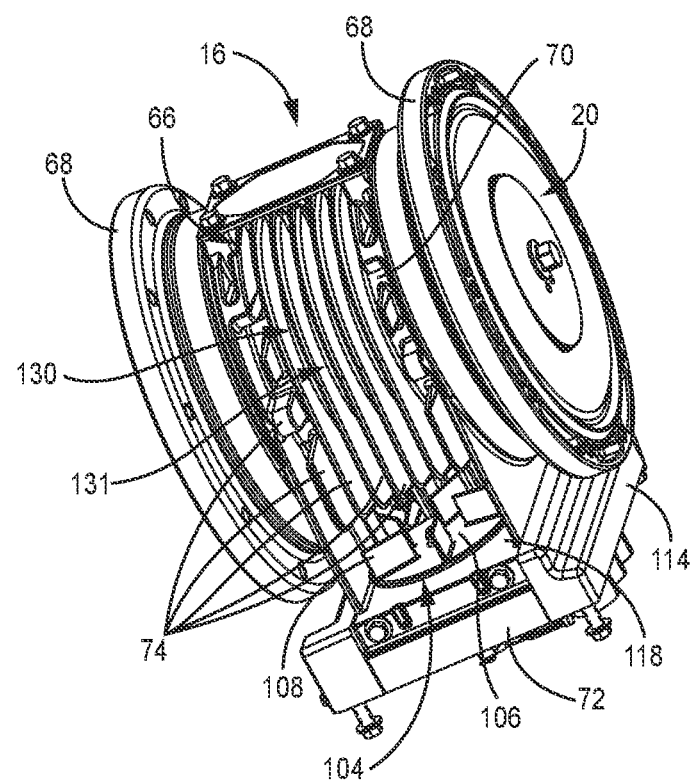
FIG. 4C is an isometric view of a pump body of the electrically operated pump shown in FIG. 4A.
Figure 4D:
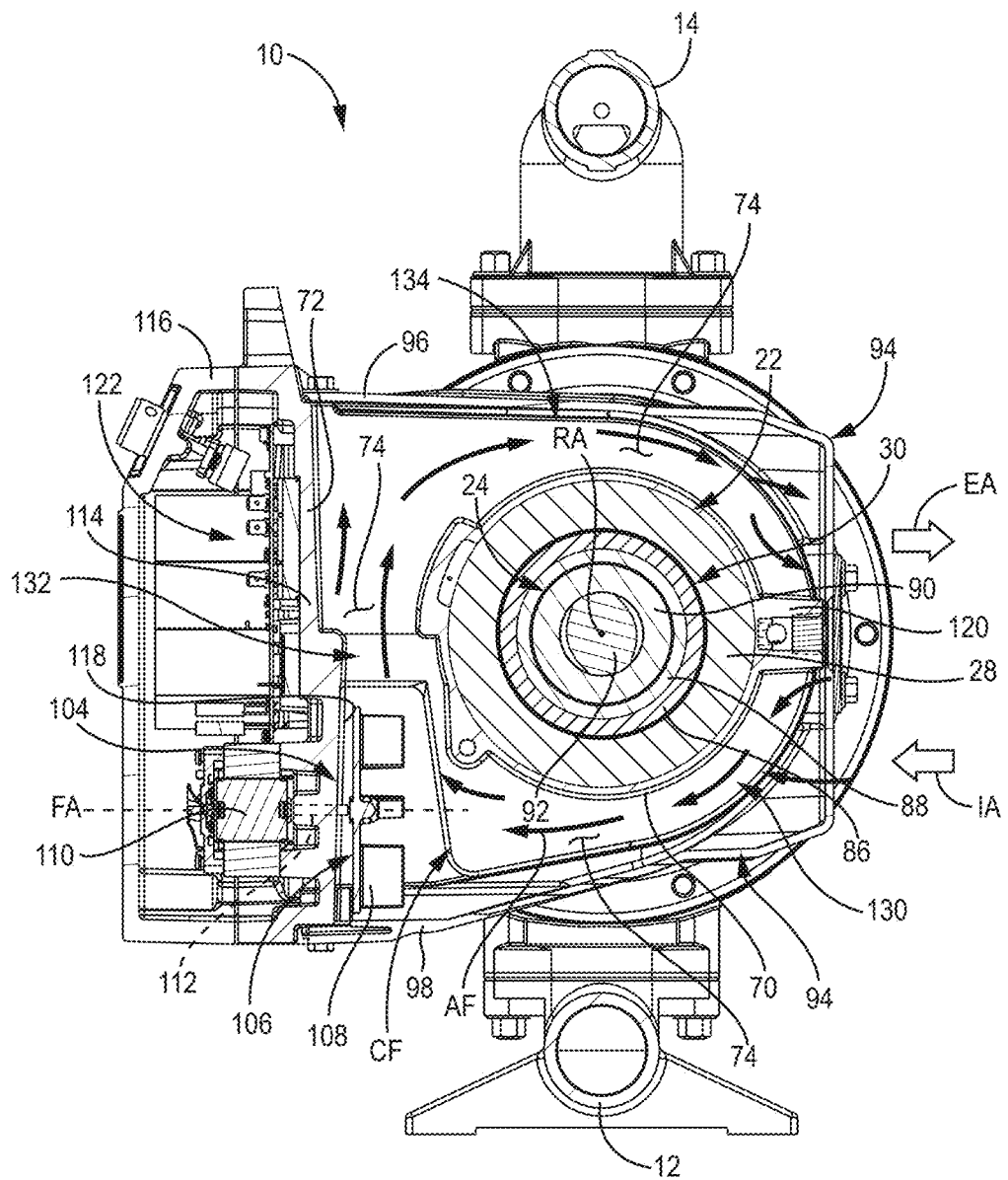
FIG. 4D is a cross-sectional view taken along line D-D in FIG. 4A.
Figure 4E:
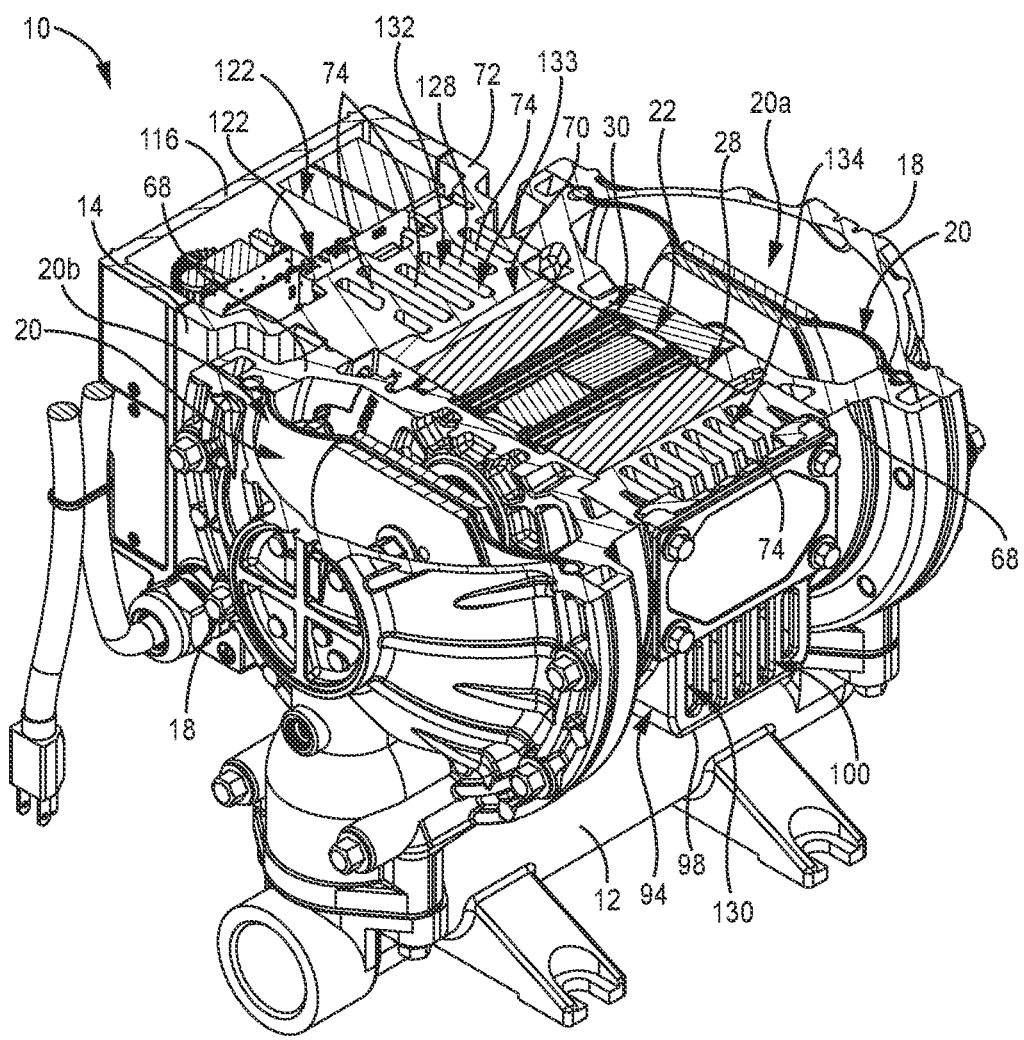
FIG. 4E is a cross-sectional view taken along line E-E in FIG. 4A.

FIG. 4A is a rear isometric view of electrically operated pump 10. FIG. 4B is a rear isometric view of pump 10 with housing cover 94 removed. FIG. 4C is an isometric view of pump body 16 of pump 10. FIG. 4D is a cross-sectional view taken along line D-D in FIG. 4A. FIG. 4E is a cross-sectional view taken along line E-E in FIG. 4A. FIGS. 4A-4E will be discussed together. Pump 10 is substantially similar to pump 1 shown in FIGS. 1A and 1B. Pump 10 includes inlet manifold 12, outlet manifold 14, pump body 16, fluid covers 18a, 18b (collectively herein "fluid cover 18" or "fluid covers 18"), fluid displacers 20a, 20b (collectively herein "fluid displacer 20" or "fluid displacers 20"), motor 22, driver 24, controller 26, fan assembly 104, and housing cover 94. Motor 22 includes stator 28 and rotor 30. Fan assembly 104 includes impeller 106 and fan motor 110. The cooling configuration shown in FIGS. 4A-4E is substantially similar to the cooling configuration shown in FIGS. 1A and 1B.

Pump body 16 includes central portion 66 and end caps 68a, 68b (collectively herein "end cap 68" or "end caps 68"). Central portion 66 includes motor housing 70, control housing 72, and heat sinks 74. Control housing 72 includes control housing block 114 and control cover 116. Rotor 30 includes permanent magnet array 86 and rotor body 88. Drive nut 90 and screw 92 of driver 24 are shown.

End caps 68a, 68b are disposed on opposite lateral sides of central portion 66 and are attached to central portion 66 to form pump body 16. Fluid covers 18a, 18b are respectively connected to end caps 68a, 68b. Inlet manifold 12 is connected to each fluid cover 18 to provide the pumped fluid to the process fluid chambers. Outlet manifold 14 is connected to each fluid cover 18 to receive fluid from the process fluid chambers.

Motor 22 and control elements 122 (such as controller 26 (FIGS. 1B and 2C), one or more circuit boards, etc.) are supported by pump body 16. More specifically, motor 22 and control elements 122 are supported by central portion 66 of pump body 16. Motor 22 is disposed within motor housing 70 between end caps 68. A body of motor housing 70 extends circumferentially around motor 22, relative to the rotational axis RA of the rotor 28, and circumferentially encloses the motor 22. The body of motor housing 70 curves away from control housing wall 118 of the control housing 72. The body of motor housing 70 can be considered to be convex towards the control housing 72. Stator 28 surrounds rotor 30 and drives rotation of rotor 30, such that motor 22 can be considered to be an inner rotator motor. Rotor 30 rotates on a rotational axis RA. Rotor 30 rotates about pump axis PA and is disposed coaxially with driver 24 and fluid displacers 20, in the example shown. Permanent magnet array 86 is disposed on rotor body 88.

Control housing 72 is connected to and extends from motor housing 70. In the example shown, portions of control housing 72 and motor housing 70 are integrally formed as a single housing component (e.g, by casting among other options). Control housing 72 is configured to house control elements 122 of pump 10, such as controller 26. In the example shown, control housing block 114 is integrally formed with motor housing 70. Control cover 116 is mounted to control housing block 114, such as by fasteners. In some examples, control cover 116 can be removably connected to control housing block 114 to provide access to the internal components within control housing 72.

Heat sinks 74 are formed on central portion 66. In the example shown, heat sinks 74 are formed in multiple configurations and include projections 124 and fins 126. Fins 126 are elongate about the rotational axis RA of rotor 30 and wrap at least partially around motor housing 70. While heat sinks 74 are shown as multiple configurations, it is understood that heat sinks 74 can be of any configuration suitable for increasing the surface area of pump body 16 to facilitate heat exchange to cool the heat generating components of pump 10. In the example shown, at least some of heat sinks 74 define flow passages forming a cooling fluid circuit CF for pump 10. The cooling circuit CF is an outer cooling fluid circuit in that cooling circuit CF extends about the exterior of motor housing 70. In the example shown, the cooling fluid circuit CF is disposed axially between the fluid displacers 20. In the example shown, the cooling fluid circuit CF does not radially overlap with a fluid displacer 20 relative to pump axis PA. The cooling fluid circuit CF is fully between the fluid displacers 20 axially along the pump axis PA.

In the example shown, support sinks 128 extend between and connect control housing 72 and motor housing 70, as best seen in FIG. 4E. The support sinks 128 are formed by one or more heat sinks 74 that extend between and connect the control housing block 114 and motor housing 70. The support sinks 128 can be integrally formed with both the control housing block 114 and motor housing 70. The support sinks 128 at least partially define the cooling fluid circuit CF. More specifically, the support sinks 128 at least partially define the channels 133 of the intermediate passage 132 of the cooling fluid circuit CF. The support sinks 128 structurally connect control housing block 114 and motor housing 70 and facilitate heat transfer from the heat generating components of pump 10. Support sinks 128 can be exposed to the cooling flow through the cooling fluid circuit CF on both axial sides of the support sinks 128 relative to the rotational axis RA, which is also relative to the pump axis PA in the example shown.

Housing cover 94 is mounted to pump body 16 and at least partially defines flow passages of the cooling fluid circuit CF. Cooling fluid circuit CF is at least partially enclosed by the housing cover 94. Inlet openings 100 and outlet openings 102 are formed through housing cover 94. In some examples, housing cover 94 is formed as an exhaust cover 96 connected to pump body 16 on an upper side of central portion 66 (e.g., between outlet manifold 14 and central portion 66 in the example shown), and as intake cover 98 connected to pump body 16 on a lower side of central portion 66 (e.g., between inlet manifold 12 and central portion 66 in the example shown). As such, housing cover 94 can be formed from multiple discrete components assembled to pump 10 to at least partially define cooling fluid circuit CF. It is understood, however, that housing cover 94 can be formed by as many or as few components as desired. In some examples, housing cover 94 is disposed on only one side of central portion, such as by housing cover 94 including exhaust cover 96 and not intake cover 98.

The main heat sources of pump 10 include controller 26, stator 28, and driver 24. Cooling fluid circuit CF directs cooling air through passages proximate the heat generating components to effect heat exchange between the flow of cooling air through cooling fluid circuit CF and the heat sources to thereby cool pump 10. Cooling fluid circuit CF is configured to direct cooling air around motor housing 70. Cooling fluid circuit CF directs cooling air circumferentially around the rotational axis RA of rotor 30. Cooling fluid circuit CF is configured to direct cooling air to provide cooling to elements in both motor housing 70 and control housing 72. A cooling assembly, similar to cooling assembly 5 (FIG. 1B), actively blows cooling airflow through the cooling fluid circuit CF to facilitate cooling of the heat generating components of pump 10. In the example shown, the cooling assembly can be considered to include at least fan assembly 104. The cooling assembly can be considered to further include flow directing components, such as housing cover 94.

The flowpath of cooling fluid circuit CF extends directly between the thermally conductive body of the motor housing 70 and the thermally conductive control housing wall 118. The flowpath of the cooling air in cooling fluid circuit CF wraps at least partially around the motor housing 70. In some examples, the flowpath can be curved greater than or equal to 90-degrees around the motor housing 70 between an inlet and an outlet. In some examples, the flowpath can be curved greater than or equal to 120-degrees around the motor housing 70 between an inlet and an outlet. In some examples, the flowpath can be curved greater than or equal to 180-degrees around the motor housing 70 between an inlet and an outlet. The flowpath of the cooling fluid circuit CF extending about the motor housing 70 exposes a large portion of the motor housing 70 to the cooling air moved by the fan assembly 104, facilitating heat exchange and cooling of motor 22. The flowpath of the cooling fluid circuit CF extends circumferentially about the rotational axis RA of the rotor 28 disposed within motor housing 70. As best seen in FIG. 4D, the flowpath of the cooling fluid circuit CF is in a plane orthogonal to the axis RA of rotation of the rotor 28, which can also be referred to as the motor axis. The flowpath does not extend through the axis of rotation RA of the rotor 28, but is instead offset from and flows around the axis of rotation RA of the rotor 28.

The flowpath of the cooling fluid circuit CF can be at least partially disposed between the fluid displacers 20a, 20b, such as along the axes of reciprocation of the fluid displacers 20a, 20b. In some examples, at least a portion of the flowpath of the cooling fluid circuit CF is disposed directly between the fluid displacers 20a, 20b. In such an example, a line parallel to the axis of rotation RA of the rotor 28 can extend through fluid displacer 20a, fluid displacer 20b, and the flowpath of the cooling fluid circuit CF. Such an axial line can extend through one or more heat sinks 74, such that the heat sinks 74 are disposed directly between the fluid displacers 20a, 20b. In some examples, as shown in FIG. 4E, a portion of the flowpath is disposed radially outside of an area directly between the fluid displacer 20a and the fluid displacer 20b and a second portion of the flowpath is disposed within the area. Disposing a portion of the flowpath directly between the fluid displacers 20a, 20b provides a compact pump arrangement and facilitates forming the flowpath close to the motor 22 to further facilitate heat transfer.

In the example shown, cooling fluid circuit CF includes intake passage 130, intermediate passage 132, and exhaust passage 134. In the example shown, there is no valving in cooling fluid circuit CF to direct flow. Instead, fan assembly 104 is configured to actively drive cooling air through cooling fluid circuit CF. Fan assembly 104 is supported by pump body 16. More specifically, fan assembly 104 is supported by control housing wall 118 of control housing 72. Impeller 106 is disposed within cooling fluid circuit CF. In the example shown, impeller 106 is disposed at an intersection between intake passage 130 and intermediate passage 132. It is understood, however, that fan assembly 104 can be disposed at any desired location relative to the cooling fluid circuit CF. For example, the fan assembly 104 can be disposed at an intersection between intermediate passage 132 and exhaust passage 134, within intermediate passage 132, among other location options. Blades 108 extend from the body of impeller 106 and drive the cooling fluid through cooling fluid circuit CF. In the example shown, blades 108 extend straight between a root connected to the body of impeller 106 and a tip opposite the root.

In the example shown, fan assembly 104 is at least partially disposed within the cooling fluid circuit CF, but it is understood that not all examples are so limited. More specifically, impeller 106 is disposed in the flowpath between an inlet of cooling fluid circuit CF and an outlet of cooling fluid circuit CF. In the example shown, impeller 106 is unshrouded, except by intake cover 98, but it is understood that impeller 106 can be shrouded in other examples. Fan motor 110 is disposed in control housing 72. Fan motor 110, which can be an electric motor, is isolated from the environment surrounding stator 28 by control housing wall 118 of control housing block 114, such that the cooling arrangement shown is suitable for use in hazardous locations. Fan shaft 112 extends through control housing wall 118 to connect impeller 106 and fan motor 110.

Impeller 106 rotates on fan axis FA to blow the cooling air through the cooling fluid circuit CF. The main flow vector of the cooling air exiting the fan assembly 104 is perpendicular to the fan axis FA and is directed directly between the motor 22 and control elements 122. More specifically, the air existing the fan assembly 104 flows directly between the thermally conductive body of motor housing 70 and the thermally conductive control housing wall 118. The main flow vector of the cooling air exiting the fan assembly 104 is directed directly between the motor housing 70 and the control housing 72. Impeller 106 is configured to output airflow radially relative to fan axis FA. In the example shown, impeller 106 is disposed axially between the motor housing 70 and the control housing 72 along the fan axis FA. In the example shown, the impeller 106 does not radially overlap with either the motor housing 70 or the control housing 72 relative to the fan axis FA. As such, a radial line extending from the fan axis FA that passes through the impeller 106 does not also pass through either of the motor housing 70 or the control housing 72. The fan assembly 104 is disposed such that the fan axis FA is disposed in an orientation perpendicular to, but offset from, the axis of rotation RA of the rotor 28.

Intake passage 130 is defined between motor housing 70 and housing cover 94. Specifically, intake passage 130 is defined between motor housing 70 and intake cover 98. In the example shown, intake passage 130 includes multiple individual channels 131 that are at least partially defined by heat sinks 74. The individual channels 131 of intake passage 130 extend arcuately around motor housing 70. The axial sides of the individual flow channels 131, along rotational axis RA of rotor 30, can be formed by heat sinks 74. As such, at least some of the individual channels 131 can be axially bracketed by heat sinks 74 relative to the rotational axis RA of rotor 30. In the example shown, at least some of heat sinks 74 can extend circumferentially, but not axially, on motor housing 70 and about the rotor axis RA of rotor 30, which is also circumferentially about the pump axis PA in the example shown. It is understood, however, that heat sinks 74 of intake passage 130 can, in some examples, be canted to extend both circumferentially about the rotational axis RA of rotor 30 and axially relative to the rotational axis RA of rotor 30. In the example shown, the individual channels 131 of intake passage 130 include at least three sides at least partially formed by thermally conductive material (e.g., the motor housing 70 and heat sinks 74). The body of motor housing 70 at least partially defines intake passage 130. Motor housing 70 is thereby directly exposed to the cooling flow through cooling fluid circuit CF. Motor housing 70 is disposed directly between stator 28 and intake passage 130 to provide efficient heat transfer from stator 28 and driver 24 to the cooling flow through cooling fluid circuit CF.

Intermediate passage 132 is disposed between control housing 72 and motor housing 70. More specifically, intermediate passage 132 is disposed between control housing block 114 and motor housing 70. Control housing wall 118 at least partially defines intermediate passage 132. One or more of the heat generating elements in control housing 72 can be mounted to control housing wall 118. The heat generating elements are thereby mounted to the control housing wall 118 that is also directly in contact with the cooling air flowing through cooling fluid circuit CF. As such, the heat generating elements are mounted to thermally conductive material (e.g., control housing wall 118 can be metallic) that is also exposed to a cooling air flow. Mounting the heat generating elements to control housing wall 118 facilitates efficient heat transfer from those components to the cooling flow through cooling fluid circuit CF.

Intermediate passage 132 is at least partially defined by the body of motor housing 70. Motor housing 70 is thereby directly exposed to the cooling flow through cooling fluid circuit CF. Motor housing 70 is disposed directly between stator 28 and intermediate passage 132 to provide efficient heat transfer from stator 28 to the cooling flow through cooling fluid circuit CF. In the example shown, at least one heat sink 74 extends between and connects control housing 72 and motor housing 70. Specifically, support sinks 128 extend between and connect control housing block 114 and motor housing 70. The support sinks 128 at least partially define intermediate passage 132 and directly contact both control housing 72 and motor housing 70. Such heat sinks 74 facilitate heat transfer from heat generating components disposed within control housing 72 and within motor housing 70. Intermediate passage 132 includes multiple individual channels 133 through which the cooling air flows.

Exhaust passage 134 is defined between motor housing 70 and housing cover 94. Specifically, exhaust passage 134 is formed between motor housing 70 and exhaust cover 96. In the example shown, exhaust passage 134 includes multiple individual channels 135 at least partially defined by heat sinks 74. The individual channels 135 of exhaust passage 134 extend arcuately around motor housing 70. An axial side, relative to the rotational axis RA of rotor 30, of each of the individual channels 135 of exhaust passage 134 is formed by a heat sink 74. In the example shown, at least some of heat sinks 74 can extend circumferentially, but not axially, on motor housing 70 and about the rotational axis RA of rotor 30. It is understood, however, that heat sinks 74 of exhaust passage 134 can, in some examples, be canted to extend both circumferentially about rotational axis RA of rotor 30 and axially relative to the rotational axis RA of rotor 30. In the example shown, the channels 135 of exhaust passage 134 include at least three sides that are at least partially formed by thermally conductive material (e.g., the motor housing 70 and heat sinks 74). The body of motor housing 70 at least partially defines exhaust passage 134. Motor housing 70 is thereby directly exposed to the cooling flow through cooling fluid circuit CF. Motor housing 70 is disposed directly between stator 28 and exhaust passage 134 to provide efficient heat transfer from stator 28 to the cooling flow through cooling fluid circuit CF.

During operation, fan motor 110 is powered to drive rotation of impeller 106. Fan assembly 104 draws air into cooling fluid circuit CF through inlet openings 100. Inlet openings 100 provide locations for air to enter into cooling fluid circuit CF and are in fluid communication with the surrounding environment. As such, the ambient air in the environment of pump 10 can form the cooling fluid of cooling fluid circuit CF. While multiple inlet openings 100 are shown, it is understood that cooling fluid circuit CF can include any desired number of inlet openings 100, such as one or more. Inlet openings 100 can also be spaced circumferentially along intake passage 130 relative to the rotational axis RA of rotor 30. For example, one or more additional or alternative inlet openings 100 can be formed at circumferential locations along housing cover 94 between the location currently shown and the position of fan 104. For example, one or more of the inlet openings 100 can be disposed between the inlet manifold 12 and motor housing 70.

Impeller 106 draws intake air (shown by arrow IA) through intake passage 130 and over motor housing 70 and heat sinks 74. The flow of cooling air (shown by arrows AF in FIG. 4D) passes over heat sinks 74 and motor housing 70 and draws heat from those elements to effect cooling of those elements. Impeller 106 blows the air downstream through intermediate passage 132 and exhaust passage 134. The cooling air blown by the impeller 106 initially flows through the channels 133 of intermediate passage 132. The air flowing through intermediate passage 132 contacts both control housing 72 and motor housing 70 to transfer heat from both the heat generating components in control housing 72 (e.g., controller 26 among others) and from the heat generating components of in motor housing 70 (e.g., stator 28 and driver 24). At least a portion of the flow through cooling fluid circuit CF flows directly between the motor 22 and an electric component 29 mounted to housing wall 118. A radial line extending from the rotational axis RA of rotor 30 can extend through driver 24, stator 28, a passage through cooling fluid circuit CF and an electric component 29 mounted to housing wall 118. Such a configuration facilitates efficient cooling of the heat generating components by wicking heat from heat generating components disposed on opposite sides of and bracketing the cooling fluid circuit CF.

At least a portion of cooling fluid circuit CF is radially bracketed, relative to the rotational axis RA of rotor 30, by two unique heat sources. Specifically, intermediate passage 132 is exposed to thermally conductive element on both radial sides of intermediate passage 132 relative to the rotational axis RA of rotor 30. The electric elements within control housing 72 form a first heat source cooled by the flow through cooling fluid circuit CF and the stator 28 and driver 24 within motor housing 70 form a second heat source cooled by the flow through cooling fluid circuit CF. Intermediate passage 132 is adjacent to the fan assembly 104. Intermediate passage 132 is disposed directly downstream from impeller 106, in the example shown. The air entering and then flowing through intermediate passage 132 has the greatest velocity of the flow through cooling fluid circuit CF. The high velocity facilitates quick air exchange and decreases residence time, providing enhanced cooling efficiency in the portion of cooling fluid circuit CF exposed to two independent heat sources disposed on opposite sides of the cooling fluid circuit CF.

Impeller 106 blows the cooling air downstream through intermediate passage 132. The cooling air flows through intermediate passage 132 and flows through exhaust passage 134. The cooling air further cools pump 10 as the air flows through exhaust passage 134 to outlet openings 102. The cooling air exits cooling fluid circuit CF through outlet openings 102 as exhaust air (shown by arrow EA). In some examples, pump 10 includes deflectors and/or contouring to direct heated exhaust air exiting outlet openings 102 away from inlet openings 100. In some examples, pump 10 includes deflectors and/or contouring such that an air intake is oriented away from outlet openings 102 to avoid intake of hot exhaust air. In the example shown, the flowpath of the cooling fluid circuit CF extends about the motor housing 70 such that one or more inlet locations, through which intake air IA is drawn, and one or more outlet locations, through which exhaust air EA is emitted, are on the same side of the motor 22. For example, inlet air IA can be drawn into intake passage 130 at a location proximate blocker wall 120 and exhaust air EA can be emitted from exhaust passage 134 at a location proximate blocker wall 120 but on an opposite circumferential side of blocker wall 120 from the inlet location. For example, the inlet locations and the outlet locations can be on the same side of a radial line extending through the rotational axis RA of rotor 30. In the example shown, the inlet locations and outlet locations are disposed on the same lateral side of a vertical radial line through the rotational axis RA of the rotor 30. The inlet and outlet locations are on an opposite side of motor 22 from control housing 72.

Blocker wall 120 extends radially from motor housing 70 relative to the rotational axis RA of the rotor 30. Blocker wall 120 is disposed circumferentially between intake passage 130 and exhaust passage 134 relative to the rotational axis RA of the rotor 30. Blocker wall 120 prevents cool intake air entering intake passage 130 from crossing into exhaust passage 134 and prevents heated exhaust air from exhaust passage 134 from crossing into intake passage 130. Blocker wall 120 can further act as a heat sink to conduct heat away from stator 28 and driver 24.

One or more of heat sinks 74 can be formed as a continuous projection extending through multiple portions of the cooling fluid flowpath CF. For example, a single heat sink 74 can extend from blocker wall 120, through intake passage 130, through intermediate passage 132, and through exhaust passage 134 and back to blocker wall 120. As such, one or more of heat sinks 74 can extend fully circumferentially about motor 22 relative to the rotational axis RA of the rotor 30 and between a common connection point (e.g., blocker wall 120).

The cooling air flow AF is drawn into cooling fluid circuit CF by fan assembly 104 and blown through cooling fluid circuit CF. The cooling air flow AF flows between two independent heat sources contained in control housing 72 and motor housing 70 and downstream out of cooling fluid circuit CF. The cooling air flow AF is routed circumferentially about motor housing 70 and the rotational axis RA of the rotor 30. The cooling fluid circuit CF can be considered to extend arcuately about the rotational axis RA of the rotor 30. The cooling air flow AF flows around both the axis of rotation RA of rotor 30 and the axis of reciprocation of fluid displacers 20. In the example shown, the cooling air flow AF contacts motor housing 70 about a full circumferential length of the cooling fluid circuit CF. The cooling air flow AF contacts control housing 72 along a portion of the length of the cooling fluid circuit CF.

The cooling configuration of pump 10 provides significant advantages. Cooling fluid circuit CF draws cooling air from the environment surrounding pump 10, providing an unlimited source of cooling air. Fan assembly 104 actively pulls the cooling fluid into cooling fluid circuit CF and blows the cooling fluid downstream through cooling fluid circuit CF to the outlet. Fan assembly 104 actively blows the air through cooling fluid circuit CF, facilitating greater flow and more efficient cooling. Cooling fluid circuit CF provides cooling to both the heat generating elements in control housing 72 and the heat generating elements in motor housing 70. By cooling multiple distinct heat sources, cooling fluid circuit CF simplifies the arrangement of pump 10 and provides for a more compact, efficient pumping assembly. Cooling fluid circuit CF routes the cooling air circumferentially around motor housing 70, maximizing the heat transfer area between motor housing 70 and the cooling air flow AF.

Figure 5A:
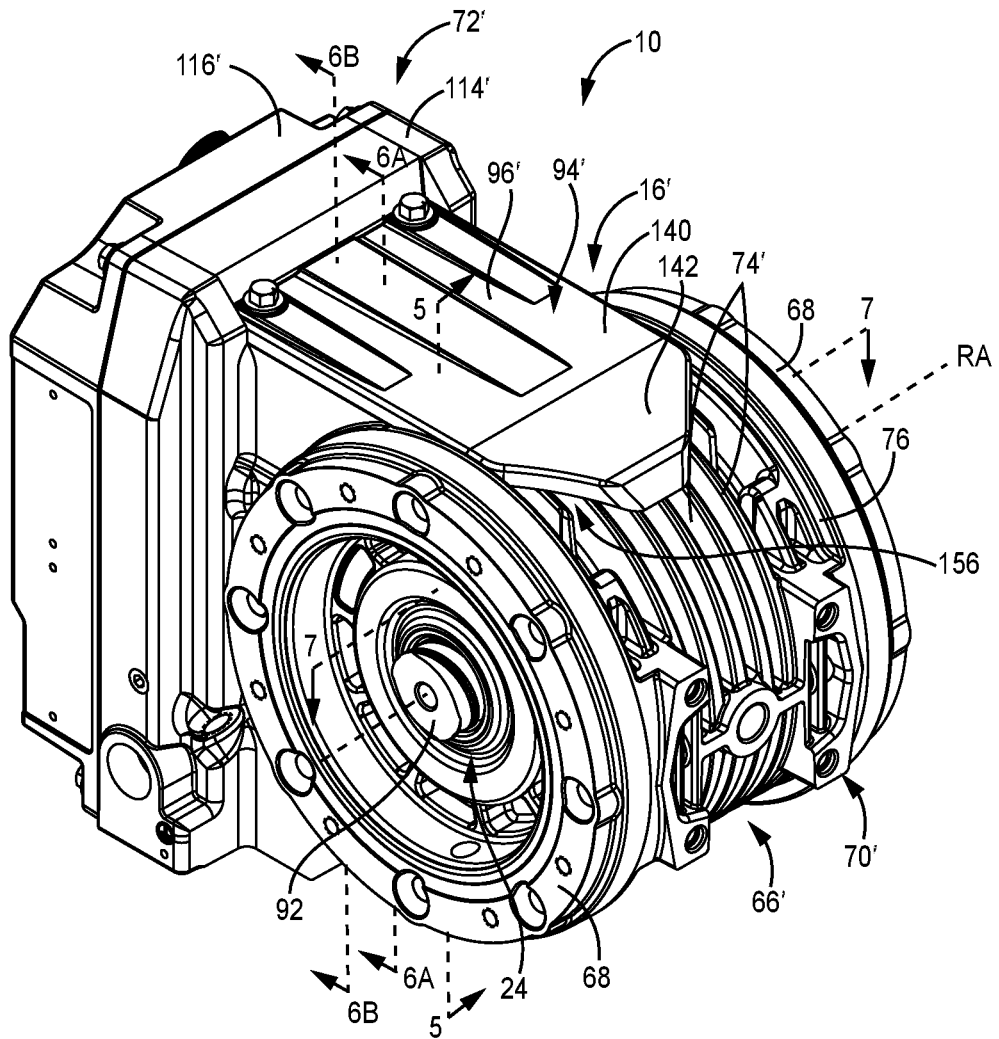
FIG. 5A is a first isometric view of a pump.
Figure 5B:
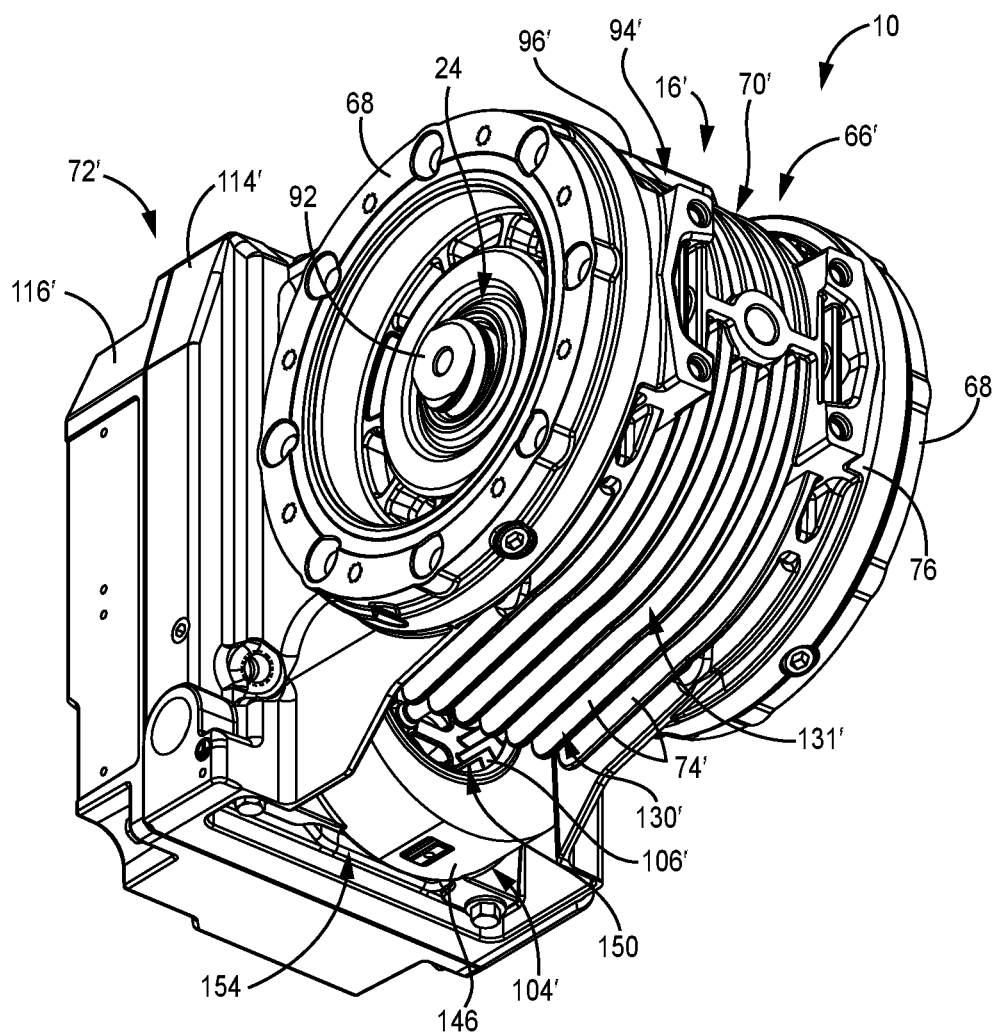
FIG. 5B is a second isometric view of the pump.
Figure 5C:
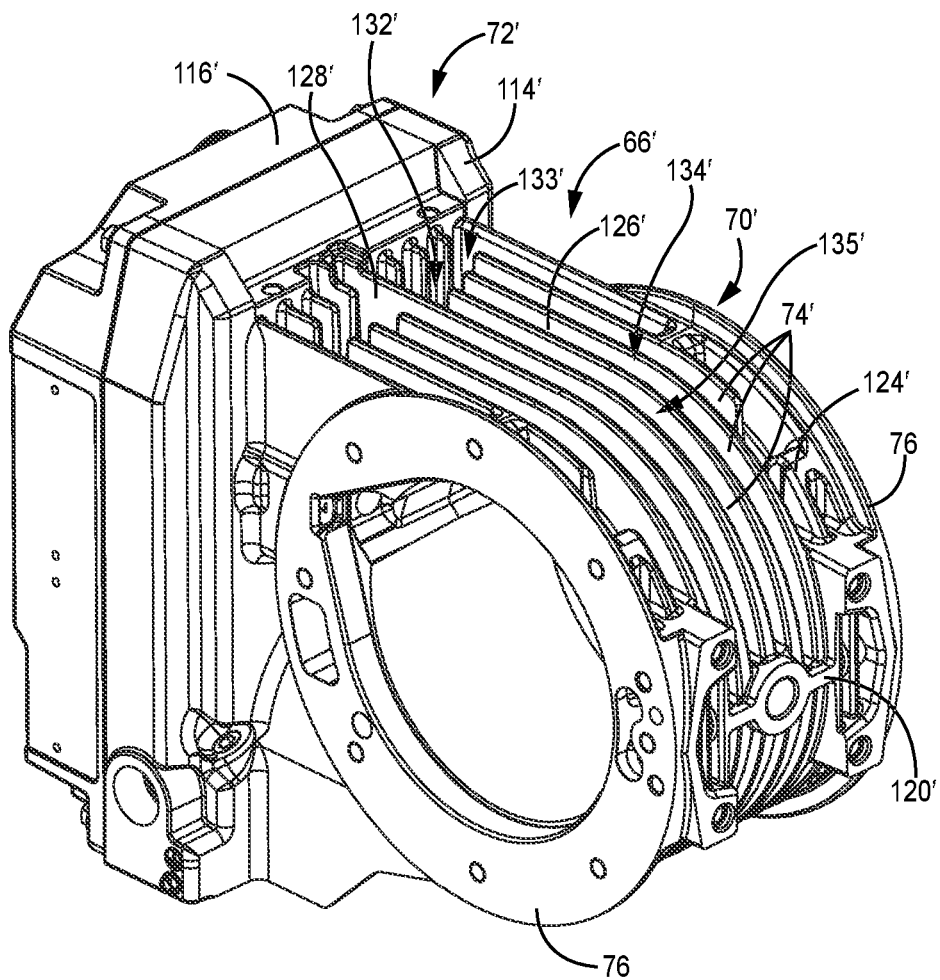
FIG. 5C is an isometric view of a center section of a pump.
Figure 5D:
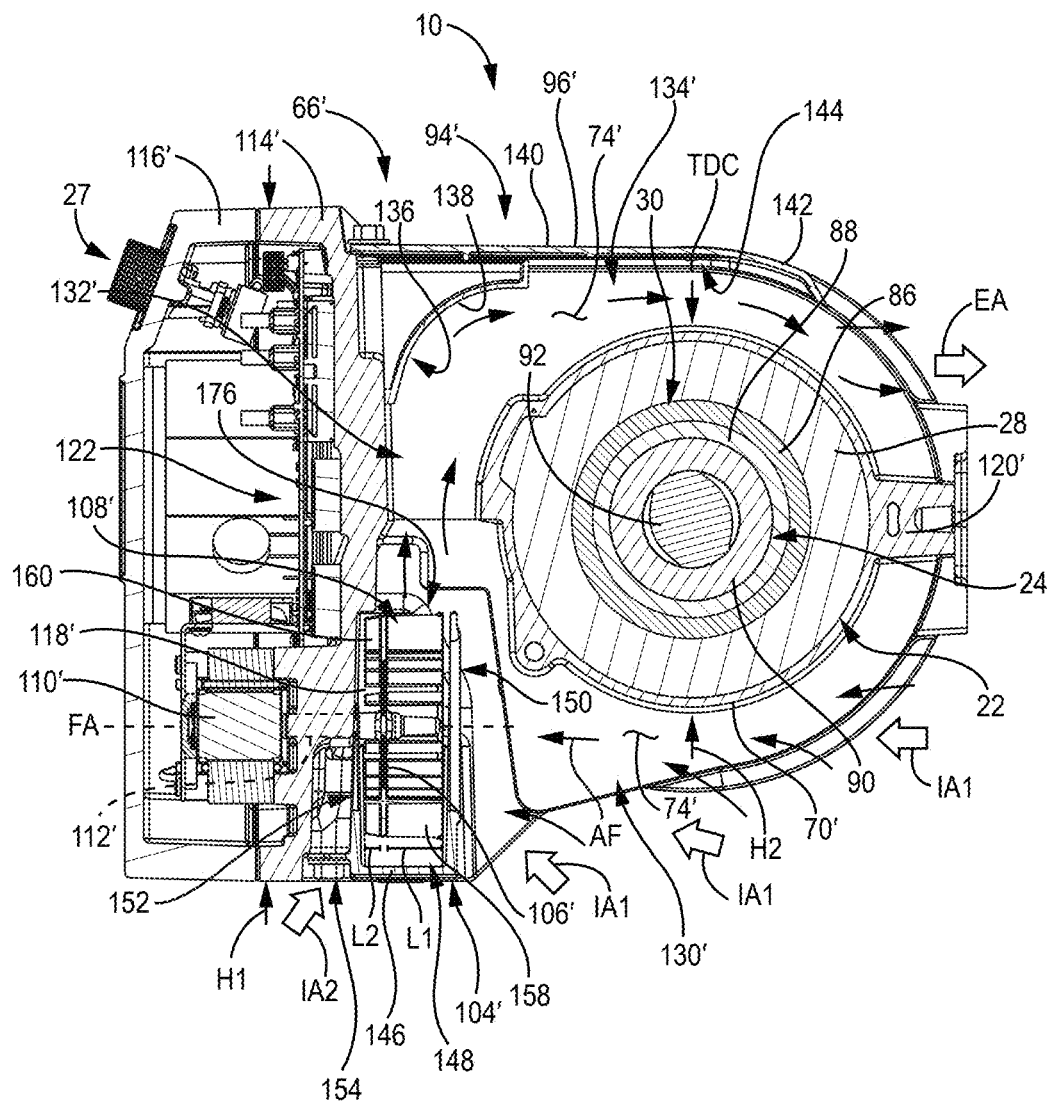
FIG. 5D is a cross-sectional view taken along line 5-5 in FIG. 5A.

FIG. 5A is a first isometric view of a pump 10. FIG. 5B is a second isometric view of the pump 10. FIG. 5C is an isometric view of central portion 66'. FIG. 5D is a cross-sectional view taken along line 5-5 in FIG. 5A. FIGS. 5A-5D will be discussed together. Central portion 66' and end caps 68 of pump body 16', motor 22, driver 24, control elements 122, fan assembly 104', and housing cover 94' of pump 10 are shown. Pump 10 is substantially similar to pump 1 shown in FIGS. 1A and 1B. Central portion 66' includes motor housing 70', control housing 72', and heat sinks 74'. Control housing 72' includes control housing block 114' and control cover 116'. Motor 22 includes stator 28 and rotor 30. Driver 24 includes drive nut 90 and screw 92. Fan assembly 104' includes impeller 106', fan motor 110', and shroud 146. Housing cover 94' includes exhaust cover 96' and baffle 136.

The cooling configuration shown in FIGS. 5A-7B is substantially similar to the cooling configuration shown in FIGS. 4A-4E. The cooling configuration shown in FIGS. 5A-7B is substantially similar to the cooling configuration shown in FIGS. 1A and 1B. Cooling air is drawn into the cooling fluid circuit by a fan assembly and routed circumferentially about the motor housing 70', relative to the rotational axis RA of the rotor 30, to provide active cooling to the heat generating components of the pump 10. Components in FIGS. 5A-7B that are similar to components in FIGS. 4A-4E are indicated with a prime (e.g., motor housing 70 in FIGS. 4A-4E and motor housing 70' in FIGS. 5A-7B).

Central portion 66' of pump body 16' houses motor 22 and control elements 122 that are connected to motor 22, electrically and/or communicatively, to control operation of motor 22 and thus control pumping by pump 10. Motor 22 is disposed within motor housing 70'. Motor housing 70' can be substantially similar to motor housing 7 (FIG. 1B). More specifically, motor 22 is disposed within the body of motor housing 70'. The body of motor housing 70' forms a wall that extends fully about the motor 22 and the rotational axis RA to enclose the motor 22 within the motor housing 70'. The body of motor housing 70' can be considered to form an annular wall that is exposed to the cooling fluid circuit CF. The body of motor housing 70' curves away from control block wall 118' of control housing 72'. The body of motor housing 70' can be considered to be convex towards control block wall 118' of control housing 72'. In the example shown, motor 22 is disposed within motor housing 70' and between end caps 68. End caps 68 are mounted to opposite axial sides of motor housing 70' along the rotational axis RA. Stator 28 surrounds rotor 30 and drives rotation of rotor 30, such that motor 22 can be considered to be an inner rotator motor. Rotor 30 rotates about the rotational axis RA and is disposed coaxially with driver 24 and fluid displacers 20 (not shown in FIGS. 5A-5D). Permanent magnet array 86 is disposed on rotor body 88. It is understood that the rotational axis RA can be coaxial with the pump axis along which the fluid displacers reciprocate.

Control housing 72' is connected to and extends from motor housing 70'. Control housing 72' can be substantially similar to control housing 72 (FIG. 1B). In the example shown, portions of control housing 72' and motor housing 70' are integrally formed as a single component (e.g., by casting, among other options). Control housing 72' is configured to house control elements 122 of pump 10, such as controller 26. In the example shown, control housing block 114' is integrally formed with motor housing 70'. Control housing 72' is mounted to control housing block 114', such as by fasteners. In some examples, control housing 72' can be removably connected to control housing block 114' to provide access to the internal components within control housing 72'. In some examples, a width of the control housing 72' is greater than a width of the motor 22 taken perpendicular to the rotational axis RA. The control housing 72' extends both above and below the motor 22 such that the motor 22 can be considered to be fully within a vertical footprint of the control housing 72'. In the example shown, a height H1 of the control housing 72' is greater than a height H2 of the body of the motor housing 70'.

Heat sinks 74' are formed on central portion 66'. In the example shown, heat sinks 74' are formed in multiple configurations and include projections 124' and fins 126', but it is understood that heat sinks 74' can be of any configuration suitable for increasing the surface area of pump body 16 to facilitate heat exchange to cool the heat generating components of pump 10. Projections 124' are aligned with fastener openings through the axial ends of motor housing 70'. Projections 124' define portions of the fastener bores and receive the fasteners, such as the fasteners 64 that secure end caps 68 to central portion 66'.

In the example shown, at least some of heat sinks 74' define flow passages forming a cooling fluid circuit CF for pump 10. The cooling fluid circuit CF is an outer cooling fluid circuit in that cooling fluid circuit CF extends about the exterior of motor housing 70'. In the example shown, the cooling fluid circuit CF is disposed axially between the fluid displacers 20. In the example shown, the cooling fluid circuit CF does not radially overlap with a fluid displacer 20 relative to the rotational axis RA. In the example shown, support sink 128' extends between and connects control housing 72' and motor housing 70'. The support sink 128' is formed by one or more heat sinks 74' that extend between and connect the control housing block 114' and motor housing 70'. The support sink 128' can be integrally formed with both the control housing block 114' and motor housing 70'. The support sink 128' at least partially defines a portion of the cooling fluid circuit CF. In the example shown, a single support sink 128' extends between motor housing 70' and control housing 72' within the cooling fluid circuit CF such that that support sink 128' is exposed to the cooling airflow on both axial sides of the support sink 128' relative to the rotational axis RA. Such a configuration provides relatively large cooling channels 133' through the intermediate passage 132' of cooling fluid circuit CF, which intermediate passage 132' is disposed between control housing 72' and motor housing 70'. The single support sink 128' within the flowpath of the cooling air provides less restriction than multiple support sinks 128' fully in the flowpath, thereby facilitating laminar flow and decreasing residence time.

Housing cover 94' is mounted to pump body 16 and at least partially defines flow passages of the cooling fluid circuit CF. Housing cover 94' at least partially encloses the cooling fluid circuit CF. In the example shown, pump 10 is configured such that the intake passage 130' of the cooling fluid circuit CF is unshrouded and at least a portion of the exhaust passage 134' of the cooling fluid circuit CF is shrouded. In particular, exhaust cover 96' of housing cover 94' is mounted to pump 16 on an upper side of central portion 66' (e.g., between an outlet manifold 14 and central portion 66'). Specifically, exhaust cover 96' is fixed to control housing 72' by bolts extending through exhaust cover 96' and into control housing 72'. Baffle 136 (shown in FIG. 5D) is a portion of housing cover 94' disposed between fan assembly 104' and exhaust cover 96'.

Baffle 136 includes curved surface 138 configured to redirect the cooling air as the air flows from intermediate passage 132' to exhaust passage 134'. Baffle 136 can be mounted on heat sinks 74' and is enclosed within cooling fluid circuit CF by exhaust cover 96' of housing cover 94'. In the example shown, baffle 136 is separately formed from exhaust cover 96'. As such, housing cover 94' can be formed from multiple discrete components assembled to pump 10 to at least partially define cooling fluid circuit CF. It is understood, however, that housing cover 94' can be formed by as many or as few components as desired. For example, exhaust cover 96' and baffle 136 can be integrally formed as a single component. In some examples, housing cover 94' further includes an exhaust cover, similar to housing cover 94 (best seen in FIGS. 4A and 4D), that at least partially defines intake passage 130' of cooling fluid circuit CF.

Housing cover 94' at least partially defines exhaust passage 134' of cooling fluid circuit CF. In the example shown, housing cover 94' includes cover body 140 and contoured end 142. Cover body 140 extends between body flanges 76 disposed at the axial ends of motor housing 70' along the rotational axis RA. Contoured end 142 extends from cover body 140 and is disposed at an end of cover body 140 opposite the end adjacent control housing 72'. Contoured end 142 narrows axially, relative to the rotational axis RA, as the contoured end 142 extends away from cover body 140. Housing cover 94' both directs airflow through exhaust passage 134' of cooling fluid circuit CF and protects components of pump 10 from moisture. In the example shown, the full width cover body 140 extends at least to the top dead center TDC radial location of motor housing 70'. Cover body 140 extending to the top dead center TDC location fully encloses those portions of motor housing 70' extending circumferentially towards control housing 72' from the top dead center TDC location. Cover body 140 prevents liquid from flowing into the intermediate passage 132' of the cooling fluid circuit CF. If any liquid falls on central portion 66', the cover body 140 prevents that liquid from flowing into intermediate passage 132', and any liquid that does fall on motor housing 70' (e.g., the portion extending circumferentially from the top dead center TDC location and away from control housing 72') flows away from intermediate passage 132' and thus away from the electronic components within control housing 72'. Such a configuration facilitates quick cleaning of pump 10 during washdown as housing cover 94' prevents water ingress into intermediate passage 132'.

Housing cover 94' is spaced radially relative to the rotational axis RA from heat sinks 74' by gap 144. Gap 144 is formed such that the individual channels 135' between axially adjacent heat sinks 74', relative to the rotational axis RA, are fluidly connected. The gap 144 allows the cooling air flow to flow over the outer edges of the heat sinks 74' between the individual channels 135'. Such a configuration facilitates efficient cooling by providing larger cooling passages and allowing flow between the adjacent passages.

The main heat sources of pump 10 include controller 26, stator 28, and driver 24. Cooling fluid circuit CF directs cooling air through passages proximate the heat generating components to effect heat exchange between the flow of cooling air through cooling fluid circuit CF and the heat sources to thereby cool pump 10. Cooling fluid circuit CF is configured to direct cooling air around motor housing 70'. Cooling fluid circuit CF directs cooling air circumferentially around the rotational axis RA. Cooling fluid circuit CF extends arcuately about motor housing 70'. Cooling fluid circuit CF is configured to direct cooling air to provide cooling to the heat generating elements in both motor housing 70' and control housing 72'. A cooling assembly, similar to cooling assembly 5 (FIG. 1B), actively blows cooling airflow through the cooling fluid circuit CF to facilitate cooling of the heat generating components of pump 10. In the example shown, the cooling assembly can be considered to include at least fan assembly 104'. The cooling assembly can be considered to further include flow directing components, such as baffle 136 and housing cover 94'.

In the example shown, cooling fluid circuit CF includes intake passage 130', intermediate passage 132', and exhaust passage 134'. In the example shown, there is no valving in cooling fluid circuit CF to direct flow. Instead, fan assembly 104' is configured to actively drive cooling air through cooling fluid circuit CF. The flowpath of cooling fluid circuit CF extends about motor housing 70'. The flowpath of cooling fluid circuit CF curves at least 90-degrees about the motor housing 70'. The annular wall of the motor housing body collects heat generated by motor 22 and is exposed to the flowpath of the cooling fluid circuit CF to effect cooling of the motor 22 and other heat generating elements within the motor housing 70'.

Fan assembly 104' is supported by pump body 16. More specifically, fan assembly 104' is supported by a control housing wall 118' of control housing 72'. Impeller 106' is disposed within cooling fluid circuit CF. In the example shown, impeller 106' is disposed at an intersection between intake passage 130' and intermediate passage 132'. It is understood, however, that fan assembly 104' can be disposed at any desired location along the cooling fluid flowpath CF. For example, fan assembly 104' can be disposed proximate an intersection between intermediate passage 132' and exhaust passage 134'. In some examples, fan assembly 104' can be mounted within intermediate passage 132' and between intake passage 130' and exhaust passage 134'. In such an example, both the inlet and outlet of fan assembly 104' can be oriented vertically such that fan assembly 104' is an axial blower. Fan assembly 104' is at least partially disposed within the cooling fluid circuit CF in the example shown, but it is understood that not all examples are so limited. More specifically, impeller 106' is disposed in the flowpath between an inlet of cooling fluid circuit CF and an outlet of cooling fluid circuit CF. In the example shown, at least a portion of fan assembly 104' is disposed directly between motor 22 and the control elements 122 disposed within control housing 72'.

Shroud 146 is mounted to pump body 16'. Impeller 106' is at least partially disposed within shroud 146. Impeller 106' is disposed in impeller chamber 148 defined by shroud 146 and pump body 16'. In the example shown, fan assembly 104' includes primary inlet 150 and secondary inlet 152. Primary inlet 150 is oriented towards intake passage 130'. Secondary inlet 152 is oriented towards control housing 72'. A housing passage 154 is at least partially defined by control housing 72' and provides a flowpath for cooling air to flow to secondary inlet 152. In the example shown, primary inlet 150 and secondary inlet 152 are disposed coaxially on a fan axis FA on which impeller 106' rotates. Fan motor 110' is disposed in control housing 72'. Fan motor 110', which can be an electric motor, is isolated from the environment surrounding stator 28 by control housing wall 118' of control housing block 114', such that the cooling arrangement shown is suitable for use in hazardous locations. Fan shaft 112' extends through control housing wall 118' to connect fan motor 110' and impeller 106'.

Impeller 106' is configured to draw cooling fluid into shroud through both primary inlet 150 and secondary inlet 152. Impeller 106' blows the cooling air downstream out of fan outlet 176. In the example shown, the fan outlet 176 is disposed directly between the motor housing 70' and the control housing 72' such that a line parallel to the fan axis FA can pass through each of the motor housing 70', the shroud 146, and the control housing 72', In the example shown, the fan assembly 104' is configured such that a line parallel to the fan axis FA can pass through each of the motor housing 70', shroud 146, impeller 106', and control housing wall 118'. As such, those components can be considered to axially overlap relative to fan axis FA.

The main flow vector of the cooling air exiting the fan assembly 104' is perpendicular to the fan axis FA and is directed directly between the motor 22 and control elements 122. More specifically, the air existing the fan assembly 104' flows directly between the thermally conductive body of motor housing 70' and the thermally conductive control housing wall 118'. The main flow vector of the cooling air exiting the fan assembly 104' is directed directly between the motor housing 70' and the control housing 72'. Impeller 106 is configured to output airflow radially relative to fan axis FA. In the example shown, impeller 106 is disposed axially between the motor housing 70 and the control housing 72 along the fan axis FA. In the example shown, at least a portion of the impeller 106 does not radially overlap with either the motor housing 70 or the control housing 72 relative to the fan axis FA. As such, a radial line extending from the fan axis FA that passes through the impeller 106 does not also pass through either of the motor housing 70 or the control housing 72. The fan assembly 104 is disposed such that the fan axis FA is disposed in an orientation perpendicular to, but offset from, the axis of rotation RA of the rotor 28.

Impeller 106' includes blades 108' that include primary blade projection 158 and secondary blade projection 160. Blades 108' are supported by the body of impeller 106' and blow the cooling fluid through cooling fluid circuit CF. Primary blade projections 158 extend from a first side of impeller body 164 and away from control housing 72'. Secondary blade projections 160 extend from a second side of impeller body 164, opposite the first side, and towards control housing 72'. Primary blade projections 158 have a length L1 and secondary blade projections 160 have a length L2. The length L1 is larger than the length L2. For example, a length ratio of the length L1 to the length L2 can be 2:1, 3:1, 4:1, or any other desired length ratio. The longer primary blade projections 158 facilitate greater flow of the cooling fluid through primary inlet 150 than through secondary inlet 152 to facilitate efficient cooling.

Intake passage 130' of cooling fluid circuit CF is unshrouded in the example shown. Intake passage 130' is formed on an opposite radial side of motor housing 70' from exhaust passage 134' relative to the rotational axis RA. Intake passage 130' includes multiple individual channels 131' that are each at least partially defined by heat sinks 74'. Intake passage 130' is disposed upstream of primary inlet 150 of fan assembly 104'. The individual channels 131' of intake passage 130' extend arcuately around motor housing 70'. One or both of the axial sides of the individual channels 131', along the rotational axis RA, can be formed by a heat sink 74. As such, at least some of the individual channels 131' can be axially bracketed by heat sinks 74' relative to the rotational axis RA. In the example shown, at least some of heat sinks 74' can extend circumferentially, but not axially, on motor housing 70' and about the rotational axis RA. It is understood, however, that heat sinks 74' of intake passage 130' can, in some examples, be canted to extend both circumferentially about the rotational axis RA and axially relative to the rotational axis RA.

In the example shown, the individual channels 131' of intake passage 130' include at least three sides that are each at least partially formed by thermally conductive material (e.g., the motor housing 70' and heat sinks 74'). The body of motor housing 70' at least partially defines intake passage 130'. Motor housing 70' is thereby directly exposed to the cooling flow through cooling fluid circuit CF. Motor housing 70' is disposed directly between stator 28 and intake passage 130' to provide efficient heat transfer from stator 28 to the cooling flow through cooling fluid circuit CF. In the example shown, the upstream intake passage 130' is unshrouded such that cooling air can be drawn into fan assembly from multiple different points about the rotational axis RA. As impeller 106' rotates, the cooling air is drawn into shroud 146 through both primary inlet 150 and secondary inlet 152 and is blown downstream through intermediate passage 132' and then to downstream exhaust passage 134'. Specifically, a first portion of the cooling air is drawn into primary inlet 150 from intake passage 130' and a second portion of the cooling air is drawn into secondary inlet 152 through housing passage 154.

Intermediate passage 132' is disposed between control housing 72' and motor housing 70'. More specifically, intermediate passage 132' is disposed between control housing block 114' and motor housing 70'. Control housing wall 118' at least partially defines intermediate passage 132'. One or more of the heat generating elements in control housing 72' can be mounted to control housing wall 118'. The heat generating elements are thereby mounted to a thermally conductive part of control housing 72', formed by control housing wall 118', that is also directly in contact with the cooling air flowing through cooling fluid circuit CF. At least some of the heat generating control elements 122 are mounted directly to thermally conductive material that is also exposed directly to the cooling air flow, which thermally conductive material is formed by control housing wall 118' in the example shown. The control housing wall 118' is configured to collect heat from the control elements 122 and is also exposed to the cooling flow through the cooling fluid circuit CF. As best seen in FIG. 5D, the control elements 122 extend both above and below the motor 22 such that the motor 22 can be considered to be within a footprint of the control elements 122. Mounting the heat generating elements to control housing wall 118' facilitates efficient heat transfer from those components to the cooling flow through cooling fluid circuit CF.

Intermediate passage 132' is at least partially defined by the body of motor housing 70'. Motor housing 70' is thereby directly exposed to the cooling flow through cooling fluid circuit CF. Motor housing 70' is disposed directly between stator 28 and intermediate passage 132' to provide efficient heat transfer from stator 28 to the cooling flow through cooling fluid circuit CF. In the example shown, at least one heat sink 74' extends between and connects control housing 72' and motor housing 70'. Specifically, support sinks 128' extend between and connect control housing block 114' and motor housing 70'. The support sinks 128' at least partially define intermediate passage 132' and directly contact both control housing 72' and motor housing 70'. The support sinks 128' define the channels 133' of intermediate passage 132'. Such heat sinks 74' facilitate efficient heat transfer from both control housing 72' and motor housing 70'. In the example shown, central portion 66' includes a single support sink 128' fully within the intermediate passage 132'. Such a configuration encourages flow through intermediate passage 132' downstream from fan assembly 104' by limiting the restrictions within the intermediate passage 132' of cooling fluid circuit CF.

Exhaust passage 134' extends downstream from intermediate passage 132'. Exhaust passage 134' is at least partially defined between motor housing 70' and housing cover 94'. Baffle 136 is mounted to redirected the flow of cooling air from the intermediate passage 132' to the exhaust passage 134'. Curved surface 138 of baffle 136 provides a smoothly contoured surface at a downstream end of intermediate passage 132' such that the cooling airflow is redirected without encountering a 90-degree corner. Redirecting the cooling flow by the curved surface 138 encourages continuous flow and decreases the residence time of the cooling air within cooling flowpath CF. Baffle 136 redirecting the flow of the cooling airflow facilitates efficient cooling.

In the example shown, a first portion of exhaust passage 134' extends from intermediate passage 132' and is at disposed between motor housing 70' and exhaust cover 96'. A second portion of exhaust passage 134' extends from the first portion and can be considered to be unshrouded. The portions of the heat sinks 74' in the unshrouded portion of the exhaust passage 134' are directly exposed to the atmosphere, which is also the source of the cooling air, providing passive heat transfer to those portions of the exhaust passage 134'.

In the example shown, exhaust passage 134' includes multiple individual channels 135' at least partially defined by heat sinks 74'. The individual channels 135' of exhaust passage 134' extend arcuately around motor housing 70'. An axial side, relative to the rotational axis RA, of each channel 135' is formed by a heat sink 74. In the example shown, at least some of heat sinks 74' can extend circumferentially, but not axially, on motor housing 70' and about the rotational axis RA. It is understood, however, that heat sinks 74' of exhaust passage 134' can, in some examples, be canted to extend both circumferentially about the rotational axis RA and axially along the rotational axis RA. In the example shown, each of the individual channels 135' can include at least three sides at least partially formed by thermally conductive material (e.g., the motor housing 70' and heat sinks 74'). The body of motor housing 70' at least partially defines the exhaust passage 134'. Motor housing 70' is thereby directly exposed to the cooling flow through cooling fluid circuit CF. Motor housing 70' is disposed directly between stator 28 and exhaust passage 134' to provide efficient heat transfer from stator 28 to the cooling airflow through cooling fluid circuit CF.

During operation, fan motor 110' is powered to drive rotation of impeller 106'. Fan assembly 104' draws air into cooling fluid circuit CF through intake passage 130'. The cooling air can enter into the cooling fluid circuit CF at any point circumferentially along the intake passage 130' about the rotational axis RA. The intake passage 130' is in fluid communication with the surrounding environment. The portions of the heat sinks 74' in the intake passage 130' are exposed to the ambient air in the environment. The ambient air in the environment of pump 10 forms the cooling fluid drawn into cooling fluid circuit CF by fan assembly 104'.

Fan assembly 104' draws a first portion of intake air (shown by arrows IA1) through primary inlet 150 in shroud 146. Fan assembly 104' draws the intake air IA1 from multiple locations separated circumferentially about the motor 22. The various flows forming the intake air IA1 can flow over the motor housing 70' and heat sinks 74' to conduct heat from those thermally conductive components. Fan assembly 104' also draws a second portion of intake air (shown by arrow IA2) into the shroud 146 through secondary inlet 152. The second portion of intake air IA2 contacts control housing block 114' prior to entering shroud 146 such that the second portion of intake air IA2 can provide cooling to control housing 72' at locations upstream of shroud 146.

The flow of cooling air (shown by arrows AF in FIG. 5D) passes over heat sinks 74', control housing 72', and motor housing 70' and draws heat from those elements to effect cooling of those elements. Fan assembly 104' blows the air downstream through intermediate passage 132' and exhaust passage 134'. The cooling airflow generated by fan assembly 104' initially flows through intermediate passage 132' after exiting from shroud 146. The air flowing through intermediate passage 132' contacts both control housing 72' and motor housing 70' to transfer heat from both the heat generating components in control housing 72' (e.g., control elements 122 among others) and from the heat generating components of in motor housing 70' (e.g., stator 28 and driver 24). At least a portion of the flow through cooling fluid circuit CF flows directly between the motor 22 and a control component 122 mounted to control housing wall 118'. A radial line extending from the rotational axis RA can extend through driver 24, stator 28, a passage through cooling fluid circuit CF, and a control component 122 mounted to control housing wall 118'. Such a configuration facilitates a compact pump and efficient cooling of heat generating components on opposite sides of the cooling fluid circuit CF.

At least a portion of cooling fluid circuit CF is bracketed by two unique heat sources. Specifically, intermediate passage 132' is exposed to thermally conductive elements on both radial sides of intermediate passage 132' relative to the rotational axis RA. The electric control elements 122 within control housing 72' form a first heat source cooled by the flow through cooling fluid circuit CF and the stator 28 and driver 24 within motor housing 70' form a second heat source cooled by the flow through cooling fluid circuit CF. In the example shown, intermediate passage 132' is disposed directly downstream from impeller 106'. As such, the air entering and then flowing through intermediate passage 132' has the greatest velocity of the flow through cooling fluid circuit CF. The high velocity facilitates quick air exchange within the cooling fluid circuit CF and decreases residence time, providing enhanced cooling efficiency in the portion of cooling fluid circuit CF exposed to two independent heat sources disposed on opposite sides of the cooling fluid circuit CF.

In the example shown, fan assembly 104' blows the air downstream through intermediate passage 132'. As discussed above, it is understood that some examples include a fan assembly 104' mounted at the downstream end of intermediate passage 132', within intermediate passage 132', or at any other desired location within the cooling fluid circuit CF. In such an example, fan assembly 104' can be considered to draw the air downstream through intermediate passage 132'. The air flow exits intermediate passage 132' and flows through exhaust passage 134'. The air further cools pump 10 as the air flows through exhaust passage 134'. The air is exhausted from cooling fluid circuit CF as exhaust air (shown by arrow EA). In the example shown, the exhaust air is directed through outlets 156. The outlets 156 can be considered to be formed between the housing cover 94' and the pump body 16'. In the example shown, the outlets 156 are formed radially between the contoured end 142 of exhaust cover 96' and motor housing 70' relative to the rotational axis RA. Contoured end 142 of exhaust cover 96' curves around motor housing 70'. The curved contoured end 142 directs the exhaust air to flow within the individual channels 135' between the heat sinks 74' even after passing out from under housing cover 94', further facilitating cooling. In the example shown, the flowpath of the cooling fluid circuit CF extends about the motor housing 70' such that one or more inlet locations, through which intake air IA1 is drawn, and one or more outlet locations, through which exhaust air EA is emitted, are on the same side of the motor 22. For example, inlet air IA1 can be drawn into intake passage 130' at a location proximate blocker wall 120' and exhaust air EA can be emitted from exhaust passage 134' at a location proximate blocker wall 120' but on an opposite circumferential side of blocker wall 120' from the inlet location. For example, the inlet locations and the outlet locations can be on the same side of a radial line extending through the rotational axis RA. In the example shown, the inlet locations and outlet locations are disposed on the same lateral side of a vertical line extending radially through the rotational axis RA of the rotor 28.

Blocker wall 120' extends radially from motor housing 70' relative to the rotational axis RA. Blocker wall 120' is disposed circumferentially between intake passage 130' and exhaust passage 134' on an opposite side of motor 22 from control housing 72'. Blocker wall 120' prevents heated exhaust air from crossing into intake passage 130' and being recirculated. Blocker wall 120' can further act as a heat sink to conduct heat away from stator 28 and driver 24.

One or more of heat sinks 74' can be formed as a continuous projection extending through multiple portions of the cooling fluid flowpath CF. For example, a single heat sink 74 can extend from blocker wall 120', through intake passage 130', through intermediate passage 132', and through exhaust passage 134', and back to blocker wall 120'. As such, one or more of heat sinks 74' can extend fully circumferentially about motor 22 between a common connection point (e.g., blocker wall 120').

The cooling air flow AF is drawn into cooling fluid circuit CF by fan assembly 104' and flows between two independent heat sources contained in control housing 72' and motor housing 70' and downstream out of cooling fluid circuit CF. The cooling air flow AF is routed circumferentially about motor housing 70' and the rotational axis RA. The cooling air flow AF thereby flows around both the axis of rotation of rotor 30 and the axis of reciprocation of fluid displacers 20, in the example shown. In the example shown, the cooling air flow AF can contact motor housing 70' about a full circumferential length of the cooling fluid circuit CF. The cooling air flow AF contacts control housing 72' along a portion of the length of the cooling fluid circuit CF.

The cooling configuration of pump 10 provides significant advantages. Cooling fluid circuit CF draws cooling air from the environment surrounding pump 10, providing an unlimited source of cooling air. Fan assembly 104' actively pulls the cooling fluid into cooling fluid circuit CF and blows the cooling fluid downstream through cooling fluid circuit CF to the outlet. Fan assembly 104' actively blows the air through cooling fluid circuit CF, facilitating greater flow and more efficient cooling. Cooling fluid circuit CF provides cooling to both the heat generating elements in control housing 72' and the heat generating elements in motor housing 70'. By cooling multiple distinct heat sources, cooling fluid circuit CF simplifies the arrangement of pump 10 and provides for a more compact, efficient pumping assembly. Cooling fluid circuit CF routes the cooling air circumferentially around motor housing 70', maximizing the heat transfer area between motor housing 70' and the cooling air flow AF.

Figure 6A:
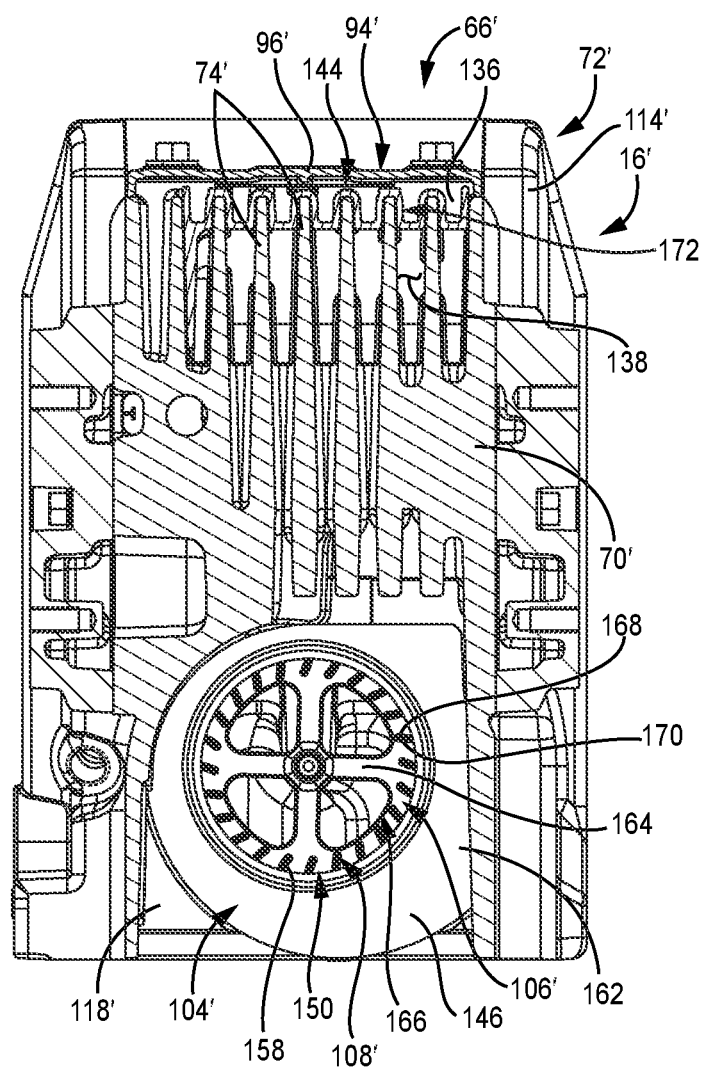
FIG. 6A is a cross-sectional view taken along line 6A-6A in FIG. 5A.
Figure 6B:
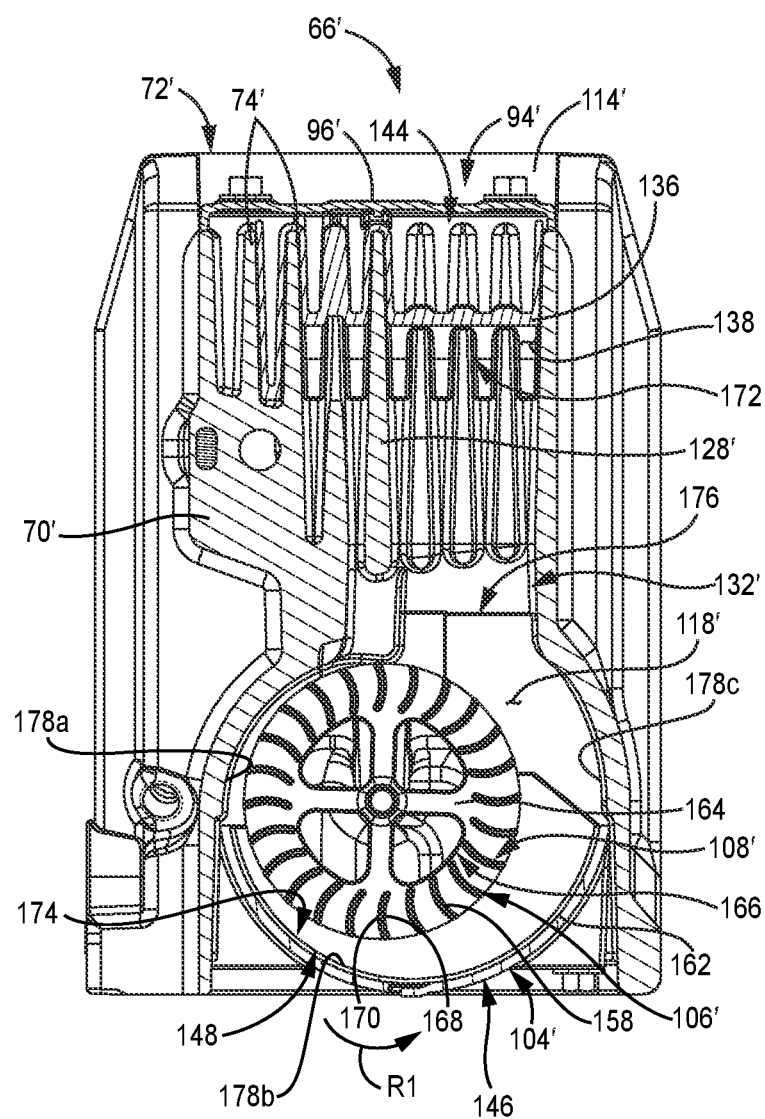
FIG. 6B is a cross-sectional view taken along line 6B-6B in FIG. 5A.

FIG. 6A is a cross-sectional view taken along line 6A-6A in FIG. 5A. FIG. 6B is a cross-sectional view taken along line 6B-6B in FIG. 5A. FIGS. 6A and 6B will be discussed together. Central portion 66' of pump body 16', fan assembly 104', and housing cover 94' of pump 10 are shown. Motor housing 70', control housing 72', and heat sinks 74' of central portion 66' are shown. Impeller 106' and impeller shroud 146 of fan assembly 104' are shown. Primary inlet 150 and shroud body 162 of impeller shroud 146 are shown. Blades 108' and impeller body 164 of impeller 106' are shown. Each blade 108' includes a pressure side 168 and a suction side 170. Exhaust cover 96' and baffle 136 of housing cover 94' are shown. Grooves 172 of baffle 136 are shown.

Fan assembly 104' is mounted to pump body 16' to blow cooling air through the cooling fluid circuit CF (best seen in FIG. 5D). Impeller 106' is supported by fan shaft 112' (FIG. 5D) that extends through control housing wall 118' between the fan motor 110' (FIG. 5D) disposed within control housing 72' and the impeller 106'. The impeller 106' is mounted within the impeller chamber 148 and rotates within the impeller chamber 148. Shroud 146 at least partially defines impeller chamber 148. Impeller chamber 148 is further defined by pump body 16'.

Impeller chamber 148 includes chamber wall 174 that extends about impeller 106'. Chamber wall 174 is partially formed by shroud 146 and partially formed by pump body 16'. Chamber wall 174 is formed as an involute curve in the example shown. The portions of chamber wall 174 formed by pump body 16' and shroud 146 form a smooth curve that encourages flow of the cooling air through fan outlet 176. The smooth curvature of the chamber wall 174 includes wall portion 178a formed by pump body 16', wall portion 178b formed by shroud 146, and wall portion 178c formed by pump body 16'. As such, the smoothly curved chamber wall 174 can be formed by portions of the pump body 16' bracketing the shroud 146 about the fan axis FA.

Impeller 106' rotates within impeller chamber 148. Impeller 106' draws cooling air into impeller chamber 148 through primary inlet 150 and secondary inlet 152 (FIG. 5D). The cooling air is blown radially outward relative to fan axis FA by blades 108' and is ejected from impeller chamber 148 through fan outlet 176. Fan outlet 176 is oriented vertically into the intermediate passage 132' of cooling fluid circuit CF. The cooling air can be ejected from the impeller chamber 148 through intermediate passage 132' and towards baffle 136. In the example shown, the cooling air is ejected vertically upward, though it is understood that the configuration can vary depending on the orientation of pump 10. As shown in FIG. 6A, a radially inner portion of each blade 108', relative to fan axis FA, is exposed through the primary inlet 150. Impeller body 164 includes openings 166 such that cooling air can flow through the impeller body 164. As such, the primary inlet 150 and secondary inlet 152 are not fluidly isolated.

Blades 108' are formed on impeller 106' and move the cooling air. The pressure side 168 of each blade 108' is concave and the suction side 170 of each blade 108' is convex. Both the primary blade projection 158 and secondary blade projection 160 of each blade 108' can be curved. In some examples, the primary blade projection 158 and secondary blade projection 160 are curved in the same manner such that blades 108' can be considered to have a common profile across the blade body from the tip of the secondary blade projection 160 to the tip of the primary blade projection 158. Impeller 106' is configured to rotate towards the pressure side 168 (e.g., in the rotational direction RI shown in FIG. 6B).

Baffle 136 is mounted on heat sinks 74'. Baffle 136 is formed with grooves 172 that are disposed over the heat sinks 74' and receive the heat sinks 74'. The heat sinks 74' extending into the grooves 172 locates the baffle 136 on pump body 16'. Baffle 136 is formed such that curved surface 138 of baffle 136 is in a direct flowpath of the cooling air exiting from fan assembly 104'. The curved surface 138 smoothly redirects the cooling airflow through the cooling fluid circuit CF.

Figure 7A:
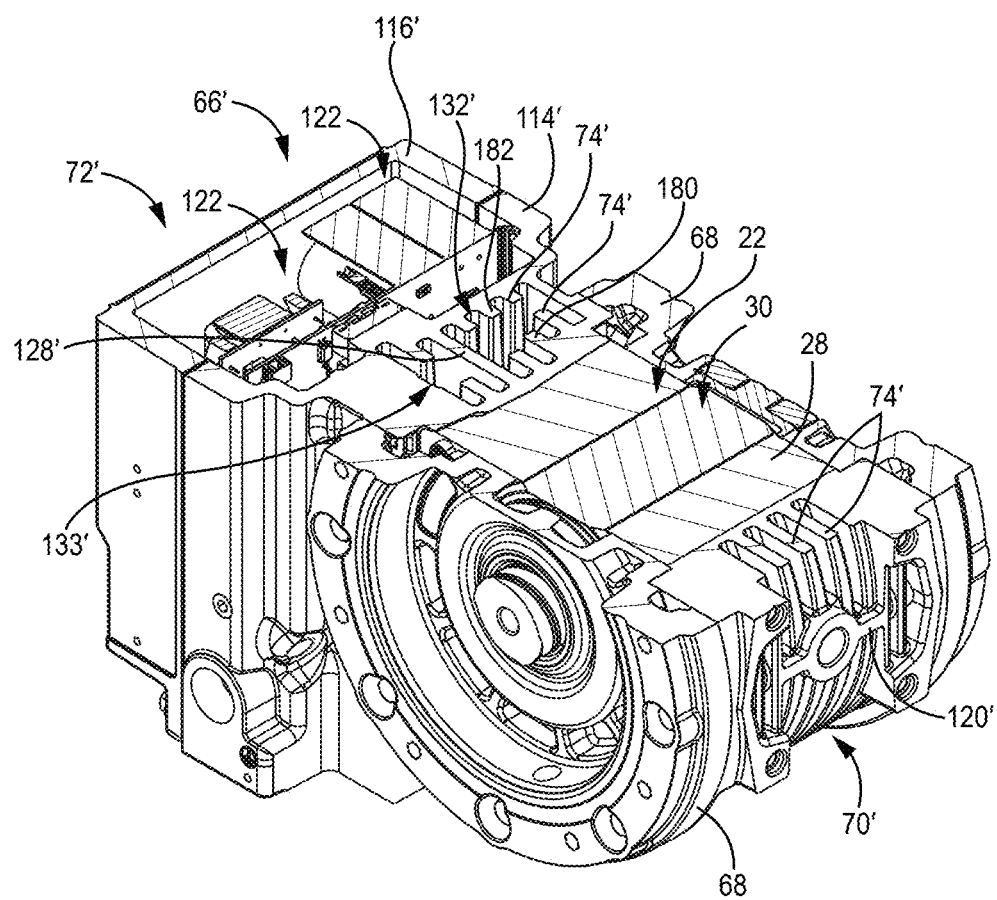
FIG. 7A is an isometric cross-sectional view taken along line 7-7 in FIG. 5A.
Figure 7B:
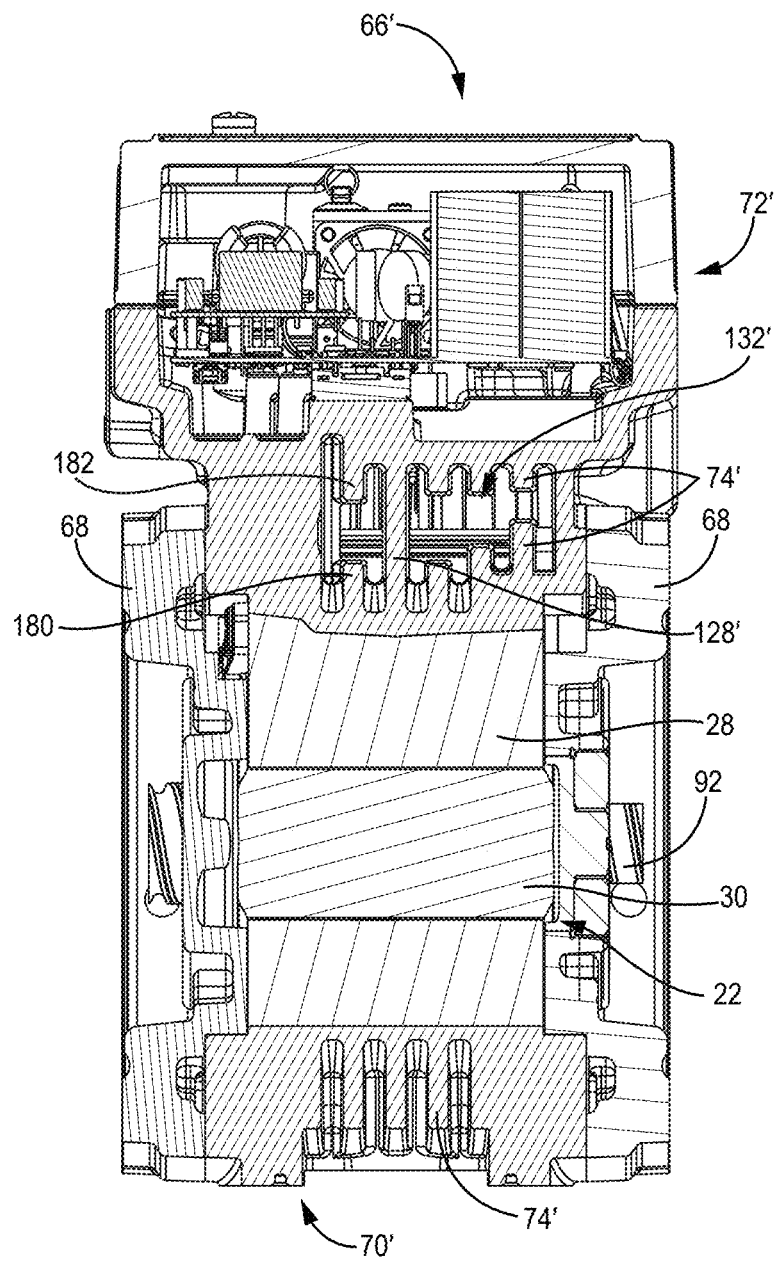
FIG. 7B is a plan cross-sectional view taken along line 7-7 in FIG. 5A.

FIG. 7A is an isometric cross-sectional view taken along line 7-7 in FIG. 5A. FIG. 7B is a plan cross-sectional view taken along line 7-7 in FIG. 5A. FIGS. 7A and 7B will be discussed together. Central portion 66' and end caps 68 of pump body 16', motor 22, driver 24, and control elements 122 of pump 10 are shown. Central portion 66' includes motor housing 70', control housing 72', and heat sinks 74'. Control housing 72' includes control housing block 114' and control cover 116'. Motor 22 includes stator 28 and rotor 30. Driver 24 includes drive nut 90 and screw 92.

Intermediate passage 132' of cooling fluid circuit CF is shown. Heat sinks 74' are formed on and project from both control housing 72' and motor housing 70' of pump body 16'. As shown, a single support sink 128' is disposed within the intermediate passage 132' of the cooling fluid circuit CF. The support sink 128' divides the intermediate passage 132' into multiple cooling channels 133'. The support sink 128' is connected to both the control housing 72' and the motor housing 70' such that the support sink 128' can dissipate heat from the heat generating components within the control housing 72' and within the motor housing 70'. Others of the heat sinks 74' project into the intermediate passage 132' but do not span the intermediate passage 132'. In the example shown, motor sinks 180 extend from motor housing 70' and control sinks 182 extend from control housing 72'. The motor sinks 180 increase the surface area of motor housing 70' to effect cooling of the heat generating components within motor housing 70'. The control sinks 182 increase the surface area of control housing 72' to increase the surface area of control housing 72' to effect cooling of the heat generating components within control housing 72'. Such partial-width heat sinks 74' increase the surface areas of the control housing 72' and the motor housing 70', facilitating effective heat transfer, but without the restriction that occurs from a full width heat sink. As such, heat sinks 74' can be disposed in an external portion of the flowpath of cooling fluid circuit CF (e.g., in exhaust passage 134' proximate blocker wall 120') and heat sinks 74' can be disposed in an internal portion of the flowpath of cooling fluid circuit CF (e.g., in intermediate passage 132'). The individual channels 133' within the intermediate passage 132' provide the cooling air to the individual channels 135' within the exhaust passage 134' (best seen in FIG. 5D) of the cooling flowpath CF.

In the example shown, intermediate passage 132' can be considered to include dual channels 133' extending through the intermediate passage 132' and divided by the support sink 128'. In some examples, the exhaust passage 134' has a larger number of individual channels 135' than the intermediate passage 132' includes individual channels 133'. As such, the cooling flow in an individual channel 133' within the intermediate passage 132' can flow into multiple individual channels 135' within the exhaust passage 134'. Multiple individual channels 131' of the intake passage 130' can feed fan assembly 104' and then be blown into the individual channels 133' of the intermediate passage 132'.

The cooling configuration of pump 10 provides significant advantages. Cooling fluid circuit CF draws cooling air from the environment surrounding pump 10 and drives the cooling air around the exterior of motor housing 70'. Fan assembly 104' actively pulls the cooling fluid into cooling fluid circuit CF and blows the cooling fluid downstream through cooling fluid circuit CF to the outlet. Intermediate passage 132' has a small number of individual channels 133' to facilitate efficient air flow through cooling fluid circuit CF. Fan assembly 104' actively blows the air through cooling fluid circuit CF. Cooling fluid circuit CF provides cooling to both the heat generating elements in control housing 72' and the heat generating elements in motor housing 70'. By cooling multiple distinct heat sources, cooling fluid circuit CF simplifies the arrangement of pump 10 and provides for a more compact, efficient pumping assembly.

While the pumping assemblies of this disclosure and claims are discussed in the context of a double displacement pump, it is understood that the pumping assemblies and controls can be utilized in a variety of fluid handing contexts and systems and are not limited to those discussed. Any one or more of the pumping assemblies discussed can be utilized alone or in unison with one or more additional pumps to transfer fluid for any desired purpose, such as location transfer, spraying, metering, application, etc. It is further understood that the cooling configurations can be used on double displacement or single displacement pumps and can be utilized for cooling of displacement pumps utilizing any desired fluid displacer.

Discussion of Non-Exclusive Examples

The following are non-exclusive descriptions of possible examples according to the present disclosure.

A displacement pump for pumping a fluid includes an electric motor including a stator and a rotor; a fluid displacer configured to pump fluid and connected to the rotor to be driven by the rotor; a cooling circuit including a flowpath about an exterior of a motor housing that houses the electric motor; and a fan assembly configured to blow air through the cooling circuit.

The displacement pump of the preceding paragraph can optionally include, additionally and/or alternatively, any one or more of the following features, configurations and/or additional components:

A control housing extending from the motor housing, wherein electrical control components of the displacement pump are disposed in the control housing; and wherein at least a portion of the flowpath is disposed between the motor housing and the control housing such that the air blown by the fan assembly flows over and contacts both the control housing and the motor housing.

The portion of the flowpath is defined by a thermally conductive wall of the control housing and a thermally conductive body of the motor housing.

The thermally conductive body curves away from the thermally conductive wall.

The electrical control elements are mounted on a first side of the thermally conductive wall and a second side of the thermally conductive wall is exposed to the flowpath, the first side opposite the second side.

At least a portion of the fan assembly is disposed directly between the motor housing and the control housing.

The flowpath wraps at least 90-degrees about the motor housing.

The flowpath wraps at least 120-degrees about the motor housing.

The flowpath wraps at least 180-degrees about the motor housing.

The fan assembly includes an impeller configured to generate a radial output flow relative to a fan axis on which the impeller rotates.

The impeller is configured to draw air into the fan assembly from multiple inlet locations disposed about around the motor housing.

The flowpath is curved about the motor housing.

The flowpath is curved such that an inlet of the flowpath and an outlet of the flowpath are disposed on a same side of the motor relative to a radial line through an axis of rotation of the rotor.

A control housing that extends from the motor housing and within which electrical control components of the displacement pump are disposed is disposed on an opposite side of the radial line from the inlet and the outlet.

A main flow vector of cooling air exiting the fan assembly is perpendicular to a fan axis on which an impeller of the fan rotates and is directed directly between the motor and electrical control elements of the displacement pump.

A plurality of heat sinks formed on an exterior of the motor housing.

At least one first heat sink of the plurality of heat sinks extends between and connects the motor housing and a control housing within which electrical control components of the displacement pump are disposed, such that a portion of the flowpath is at least partially defined by the motor housing, the control housing, and the at least one first heat sink of the plurality of heat sinks.

At least one second heat sink of the plurality of heat sinks extends partially across the portion of the flowpath.

At least one control housing sink extends from the control housing, towards the motor housing, and partially across the portion of the flowpath; and at least one motor housing sink extends from the motor housing, towards the control housing, and partially across the portion of the flowpath.

The fan assembly includes an impeller disposed within the flowpath and configured to rotate on a fan axis; a fan motor disposed within a control housing that is connected to the motor housing; and a fan shaft extending through a wall of the control housing between the fan motor and the impeller, wherein the wall of the control housing isolates an interior of the control housing from the flowpath and is exposed to the flowpath.

At least one electrical component is mounted to the wall within the control housing.

A heat sink extends between and connects the wall and the motor housing.

The fan assembly includes a shroud and an impeller disposed within the shroud.

The shroud includes a primary inlet on a first axial side of the impeller along the fan axis.

The shroud includes a secondary inlet on a second axial side of the impeller along the fan axis.

A housing passage is at least partially defined by the control housing, wherein the housing passage is disposed on an opposite axial side of the shroud from an intake passage of the cooling circuit along the fan axis and extending from an exterior of the control housing to the secondary inlet.

An outlet of the fan assembly is oriented to output cooling airflow in a direction orthogonal to the fan axis.

The impeller includes a plurality of blades.

Each blade of the plurality of blades is curved to have a concave pressure side and a convex suction side.

At least one blade of the plurality of blades includes a primary blade projection extending in a first axial direction from a body of the impeller along the fan axis and includes a secondary blade projection extending in a second axial direction from the body of the impeller along the fan axis, and wherein the first axial direction is opposite the second axial direction.

The primary blade projection has a greater axial length along the fan axis than the secondary blade projection.

The impeller is disposed in an impeller chamber at least partially defined by the shroud, and wherein a surface of the impeller chamber oriented towards the impeller is formed as an involute curve.

A housing cover is mounted to a pump body of the displacement pump, the pump body including the motor housing, and wherein the housing cover at least partially encloses the flowpath.

The housing cover includes an exhaust cover extending over a portion of the motor housing downstream of the fan assembly.

The exhaust cover extends to a top dead center location of the motor housing.

The housing cover includes a baffle having a curved surface exposed to the flowpath, wherein the curved surface is configured to redirect cooling flow through the flowpath from an intermediate passage of the cooling circuit to an exhaust passage of the cooling circuit, wherein the intermediate passage is disposed between the motor housing and a housing block within which control elements of the displacement pump are disposed; and wherein the exhaust passage is disposed between the motor housing and the exhaust cover.

The rotor is configured to rotate on a pump axis.

The fluid displacer is configured to pump the fluid by linear reciprocation of the fluid displacer.

A driver connected to the rotor and the fluid displacer, the driver configured to convert a rotational output from the rotor into a linear input to the fluid displacer.

The fan assembly is at least partially disposed in the flowpath.

The fluid displacer is a first fluid displacer; the displacement pump further includes a second fluid displacer; and the flowpath is disposed between the first fluid displacer and the second fluid displacer, At least a portion of the flowpath is directly between the first fluid displacer and the second fluid displacer.

A first portion of the flowpath is disposed radially outside of an area directly between the first fluid displacer and the second fluid displacer and a second portion of the flowpath is disposed within the area.

A displacement pump for pumping a fluid includes an electric motor at least partially disposed in a motor housing and including a stator and a rotor; a first fluid displacer connected to the rotor such that a rotational output from the rotor provides a driving input to the first fluid displacer; and a cooling circuit extending about an exterior of the motor housing that houses the electric motor.

The displacement pump of the preceding paragraph can optionally include, additionally and/or alternatively, any one or more of the following features, configurations and/or additional components:

A control housing extending radially from the motor housing relative to the axis, wherein electrical control components of the displacement pump are disposed in the control housing; wherein a portion of the flowpath is disposed between the motor housing and the control housing such that the air blown by the fan assembly flows over and contacts both the control housing and the motor housing; wherein the portion of the flowpath is defined by a thermally conductive wall of the control housing and a thermally conductive body of the motor housing; and wherein the electrical control components are mounted to the thermally conductive wall on an opposite side of the thermally conductive wall from the portion of the flowpath.

The portion of the flowpath is formed as a plurality of channels at least partially defined by the motor housing and the control housing.

The control housing and the motor housing are integrally formed.

The flowpath is curved around the motor housing.

A fan assembly configured to blow air through the cooling circuit.

An impeller of the fan assembly is disposed in the flowpath.

A fan motor of the fan assembly is disposed in the control housing.

The impeller is disposed upstream of the portion of the flowpath.

The impeller is configured to rotate on a fan axis and the fan assembly is configured to output cooling air radially relative to the fan axis.

An outlet of the fan assembly is disposed directly between the motor housing and the control housing.

A plurality of heat sinks are formed on an exterior of the motor housing and at least one heat sink of the plurality of heat sinks extends between and connects the motor housing and the control housing such that the portion of the flowpath is at least partially defined by the motor housing, the control housing, and the at least one heat sink of the plurality of heat sinks.

A housing cover is mounted to the motor housing, wherein the flowpath is at least partially defined by the housing cover.

The flowpath includes an inlet portion, an intermediate portion extending downstream from the inlet portion, and an outlet portion extending downstream from the intermediate portion, wherein the intermediate portion is disposed between the motor housing and a control housing within which control elements of the electric motor are disposed.

The flowpath is disposed between the first fluid displacer and a second fluid displacer, the first fluid displacer and the second fluid displacer connected to the rotor to be linearly reciprocated by the rotor.

A displacement pump for pumping a fluid includes an electric motor at least partially disposed in a motor housing and including a stator and a rotor; a controller operatively connected to the electric motor, the controller disposed in a control housing extending from the motor housing; a first fluid displacer connected to the rotor such that a rotational output from the rotor provides a driving input to the first fluid displacer to cause pumping by the first fluid displacer; and a cooling circuit having a flowpath extending between the motor housing and the control housing.

The displacement pump of the preceding paragraph can optionally include, additionally and/or alternatively, any one or more of the following features, configurations and/or additional components:

The flowpath includes an inlet portion at least partially defined by the motor housing, an intermediate portion between the motor housing and the control housing, and an outlet portion between the motor housing and a housing cover, wherein cooling airflow through the intermediate portion contacts both a thermally conductive wall of the control housing and a thermally conductive body of the motor housing.

The intermediate portion is formed by a plurality of flow channels disposed between the motor housing and the control housing.

A fan assembly configured to blow cooling air through the flowpath.

A displacement pump for pumping a fluid includes an electric motor including a stator and a rotor; a fluid displacer configured to pump fluid and connected to the rotor to be driven by the rotor; a cooling circuit including a flowpath about an exterior of a motor housing that houses the electric motor; and a fan assembly configured to blow air into a portion of the flowpath disposed between a first thermally conductive wall of the motor housing and a second thermally conductive wall of a control housing in which electrical control components of the displacement pump are disposed, such that an output from the fan assembly contacts both the first thermally conductive wall and the second thermally conductive wall.

The displacement pump of the preceding paragraph can optionally include, additionally and/or alternatively, any one or more of the following features, configurations and/or additional components:

At least a portion of the fan assembly is disposed directly between the electric motor and the control housing.

At least a portion of an impeller of the fan assembly is disposed directly between the electric motor and the control housing.

An outlet of the fan assembly is disposed directly between the motor housing and the control housing.

A main flow vector output from the fan assembly is disposed orthogonal to a rotational axis of the fan assembly.

A displacement pump for pumping a fluid includes an electric motor including a stator and a rotor; a fluid displacer configured to pump fluid and connected to the rotor to be driven by the rotor; a cooling circuit including a flowpath about a curved exterior of a motor housing that houses the electric motor; and a fan assembly configured to blow air through the cooling circuit.

The displacement pump of the preceding paragraph can optionally include, additionally and/or alternatively, any one or more of the following features, configurations and/or additional components:

The fan assembly outputs the air to a portion of the flowpath between a thermally conductive wall of a control housing of the displacement pump and the curved exterior of the motor housing, and wherein electrical control components of the displacement pump are mounted on an the thermally conductive wall on an opposite side of the thermally conductive wall from the flowpath.

The curved exterior is convex towards the control housing.

A displacement pump for pumping a fluid includes an electric motor including a stator and a rotor; a fluid displacer configured to pump fluid and connected to the rotor to be driven by the rotor; a cooling circuit including a flowpath about an exterior of a motor housing that houses the electric motor; and a fan assembly configured to blow air through the cooling circuit, an inlet of the fan assembly is oriented to receive the air axially along a fan axis that an impeller of the fan assembly rotates on, and an outlet of the fan assembly is oriented to output the air transverse to the fan axis.

The displacement pump of the preceding paragraph can optionally include, additionally and/or alternatively, any one or more of the following features, configurations and/or additional components:

The outlet is oriented to output the air radially relative to the fan axis.

The motor housing is spaced in a first axial direction along the fan axis from a control housing within which electrical control components of the electric motor are disposed, and wherein the inlet is a primary inlet oriented in the first axial direction.

The fan assembly further includes a secondary inlet through which a secondary flow of air is drawn into the housing by the impeller.

The secondary inlet is disposed coaxially with the primary inlet on the fan axis.

The secondary inlet is oriented in the second axial direction.

The primary inlet is configured to draw intake air from multiple locations about the motor housing.

The fan assembly includes a motor disposed within the control housing and a fan shaft extending through a wall of the control housing and connected to the fan motor and the impeller.

A displacement pump for pumping a fluid includes an electric motor including a stator and a rotor; a motor housing that houses the electric motor and that has a housing body and a plurality of heat sinks projecting from the housing body; a fluid displacer configured to pump fluid and connected to the rotor to be driven by the rotor; a cooling circuit including a flowpath about an exterior of the motor housing; and a fan assembly configured to blow air through the cooling circuit.

The displacement pump of the preceding paragraph can optionally include, additionally and/or alternatively, any one or more of the following features, configurations and/or additional components:

A first heat sink of the plurality of heat sinks is exposed to ambient air.

A second heat sink of the plurality of heat sinks is disposed within an enclosed portion of the flowpath.

The enclosed portion of the flowpath is formed between the housing body and a control housing within which electrical control components of the electric motor are disposed.

A support heat sink extends between and connects the housing body and the control housing.

The second heat sink extends only partially across the enclosed portion of the flowpath.

The control housing includes a housing wall exposed to the flowpath, and wherein at least one control heat sink extending from the housing wall and into the flowpath.

The at least one control heat sink extends only partially across the enclosed portion of the flowpath.

A displacement pump for pumping a fluid includes an electric motor including a stator and a rotor; a fluid displacer configured to pump fluid and connected to the rotor to be driven by the rotor; a cooling circuit including a flowpath about an exterior of a motor housing that houses the electric motor; and a fan assembly configured to blow air through the cooling circuit. The flowpath extends at least 90-degrees about the motor housing.

The displacement pump of the preceding paragraph can optionally include, additionally and/or alternatively, any one or more of the following features, configurations and/or additional components:

The flowpath extends at least 90-degrees from a fan outlet of the fan assembly to an exhaust outlet of the cooling circuit.

The flowpath extends at least 120-degrees about the motor housing.

The flowpath extends at least 180-degrees about the motor housing.

The flowpath extends between an intake and an exhaust, and wherein the exhaust is at least partially defined by a cover extending over and spaced from the motor housing.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A displacement pump for pumping a fluid, the displacement pump comprising:
   an electric motor disposed in a motor housing, the electric motor including a stator and a rotor;
   a first fluid displacer configured to pump the fluid and connected to the rotor to be driven by the rotor;
   a second fluid displacer configured to pump the fluid and connected to the rotor to be driven by the rotor, wherein the rotor is disposed directly between the first fluid displacer and the second fluid displacer;
   a cooling circuit including a flowpath about an exterior of the motor housing that houses the electric motor, wherein a first portion of the flowpath wraps at least partially around the motor housing and is disposed between the first fluid displacer and the second fluid displacer; and
   a fan assembly configured to blow air through the cooling circuit.

2. The displacement pump of claim 1, further comprising:
   a control housing extending from the motor housing, wherein electrical control components of the displacement pump are disposed in the control housing; and
   wherein a second portion of the flowpath is disposed between the motor housing and the control housing such that the air blown by the fan assembly flows over and contacts both the control housing and the motor housing.

3. The displacement pump of claim 2, wherein the second portion of the flowpath is defined by a thermally conductive wall of the control housing and a thermally conductive body of the motor housing.

4. The displacement pump of claim 2, wherein at least a portion of the fan assembly is disposed directly between the motor housing and the control housing.

5. The displacement pump of claim 1, wherein the fan assembly includes an impeller configured to generate a radial output flow relative to a fan axis on which the impeller rotates.

6. The displacement pump of claim 5, wherein the impeller is configured to draw the air into the fan assembly from multiple inlet locations disposed around the motor housing.

7. The displacement pump of claim 1, wherein the flowpath is curved about the motor housing.

8. The displacement pump of claim 7, wherein the flowpath is curved such that an inlet of the flowpath and an outlet of the flowpath are disposed on a same side of the motor relative to a radial line through an axis of rotation of the rotor.

9. The displacement pump of claim 1, wherein at least one blade of an impeller of the fan assembly includes a primary blade projection extending in a first axial direction from a body of the impeller along a fan axis and includes a secondary blade projection extending in a second axial direction from the body of the impeller along the fan axis, and wherein the first axial direction is opposite the second axial direction.

10. The displacement pump of claim 1, wherein an impeller of the fan assembly is disposed in an impeller chamber at least partially defined by a shroud, and wherein a surface of the impeller chamber oriented towards the impeller is formed as an involute curve.

11. The displacement pump of claim 1, wherein a housing cover is mounted to a pump body of the displacement pump, the pump body including the motor housing, and wherein the housing cover at least partially encloses the flowpath downstream of the fan assembly.

12. The displacement pump of claim 11, wherein the housing cover includes a baffle having a curved surface exposed to the flowpath, wherein the curved surface is configured to redirect cooling flow through the flowpath from an intermediate passage of the cooling circuit to an exhaust passage of the cooling circuit, wherein the intermediate passage is disposed between the motor housing and a housing block within which control elements of the displacement pump are disposed; and wherein the exhaust passage is disposed between the motor housing and the housing cover.

13. The displacement pump of claim 1, wherein:
the first portion of the flowpath is at least partially disposed directly between the first fluid displacer and the second fluid displacer.

14. The displacement pump of claim 1, further comprising:
a control housing extending radially from the motor housing relative to an axis of rotation of the rotor, wherein electrical control components of the displacement pump are disposed in the control housing;
wherein a second portion of the flowpath is disposed between the motor housing and the control housing such that the air blown by the fan assembly flows over and contacts both the control housing and the motor housing;
wherein the second portion of the flowpath is defined by a thermally conductive wall of the control housing and a thermally conductive body of the motor housing; and
wherein the electrical control components are mounted to the thermally conductive wall on an opposite side of the thermally conductive wall from the second portion of the flowpath.

15. A displacement pump for pumping a fluid, the displacement pump comprising:
an electric motor including a stator and a rotor;
a fluid displacer configured to pump the fluid and connected to the rotor to be driven by the rotor;
a cooling circuit including a flowpath about an exterior of a motor housing that houses the electric motor; and
a fan assembly configured to blow air through the cooling circuit;
wherein at least one first heat sink of a plurality of heat sinks extends between and connects the motor housing and a control housing within which electrical control components of the displacement pump are disposed, such that a portion of the flowpath is at least partially defined by the motor housing, the control housing, and the at least one first heat sink of the plurality of heat sinks.

16. The displacement pump of claim 15, wherein at least one second heat sink of the plurality of heat sinks is formed on the exterior of the motor housing and extends partially across the portion of the flowpath.

17. The displacement pump of claim 15, wherein:
the plurality of heat sinks includes at least one control housing sink that extends from the control housing, towards the motor housing, and partially across the portion of the flowpath; and
the plurality of heat sinks includes at least one motor housing sink that extends from the motor housing, towards the control housing, and partially across the portion of the flowpath.

18. A displacement pump for pumping a fluid, the displacement pump comprising:
an electric motor including a stator and a rotor;
a fluid displacer configured to pump the fluid and connected to the rotor to be driven by the rotor;
a cooling circuit including a flowpath about an exterior of a motor housing that houses the electric motor; and
a fan assembly configured to blow air through the cooling circuit, wherein the fan assembly comprises:
an impeller disposed within the flowpath and configured to rotate on a fan axis;
a fan motor disposed within a control housing that is connected to the motor housing; and
a fan shaft extending through a wall of the control housing between the fan motor and the impeller, wherein the wall of the control housing isolates an interior of the control housing from the flowpath and is exposed to the flowpath.

* * * * *